US012473886B2

(12) United States Patent
McCall

(10) Patent No.: US 12,473,886 B2
(45) Date of Patent: Nov. 18, 2025

(54) TWO BODY VARIABLE BALLAST WAVE ENERGY CONVERTER

(71) Applicant: Dehlsen Associates, LLC, Santa Barbaraq, CA (US)

(72) Inventor: Alan L. McCall, Santa Barbara, CA (US)

(73) Assignee: Dehlsen Associates, LLC, Santa Barbara, CA (US)

( * ) Notice: Subject to any disclaimer, the term of this patent is extended or adjusted under 35 U.S.C. 154(b) by 0 days.

(21) Appl. No.: 18/657,906

(22) Filed: May 8, 2024

(65) Prior Publication Data

US 2024/0287958 A1 Aug. 29, 2024

Related U.S. Application Data

(63) Continuation-in-part of application No. 17/860,319, filed on Jul. 8, 2022, now Pat. No. 12,071,921.

(60) Provisional application No. 63/220,009, filed on Jul. 9, 2021.

(51) Int. Cl.
*F03B 13/16* (2006.01)
*F03B 13/10* (2006.01)

(52) U.S. Cl.
CPC .............. *F03B 13/16* (2013.01); *F03B 13/10* (2013.01)

(58) Field of Classification Search
CPC ................ F03B 13/16; F03B 13/10
See application file for complete search history.

(56) References Cited

FOREIGN PATENT DOCUMENTS

| EP | 2320068 A1 * | 5/2011 | .......... F03B 13/1845 |
|---|---|---|---|
| ES | 2897298 T3 * | 2/2022 | .......... F03B 13/1865 |

* cited by examiner

*Primary Examiner* — Viet P Nguyen
(74) *Attorney, Agent, or Firm* — Leason Ellis LLP

(57) ABSTRACT

A two-body wave energy converter utilizing a linear, universal modular absorber. A linear module, contains a direct drive linear machine for converting linear mechanical motion into electrical energy. The linear module is connected between two oscillating mechanical bodies, exploiting their relative motion. A wave activated floating body follows the wave motion, while a reaction body is tethered to a mass on the seabed providing a stable kinematic reference in operational waves. In large waves, the mass on the seabed lifts, providing heave compliance to the whole wave energy converter reducing ultimate loads in survival wave conditions.

19 Claims, 25 Drawing Sheets

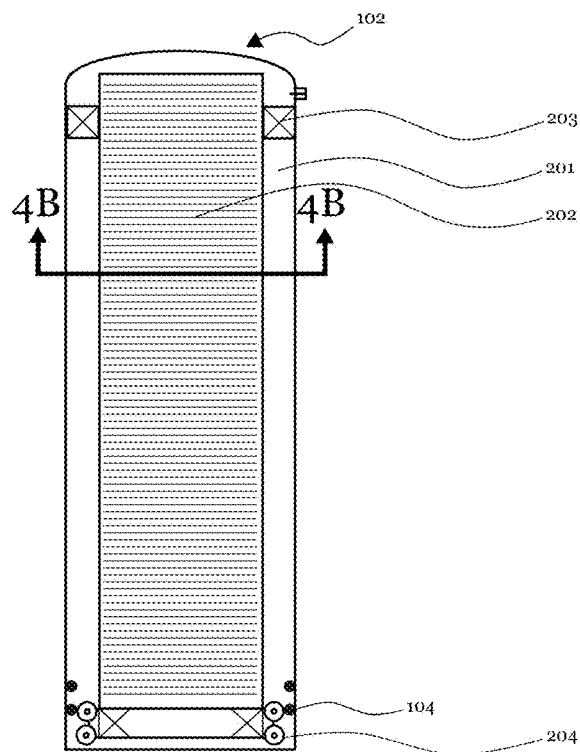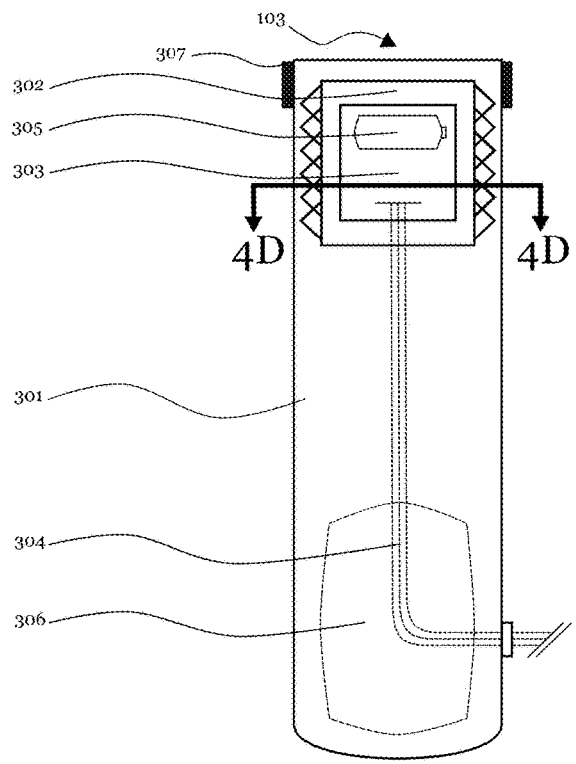
FIG 4C          FIG 4A
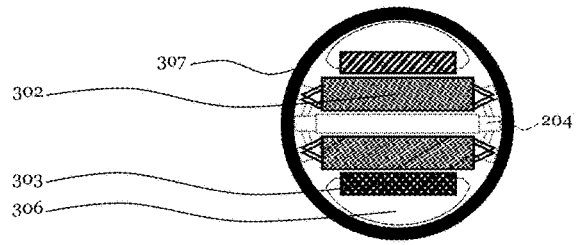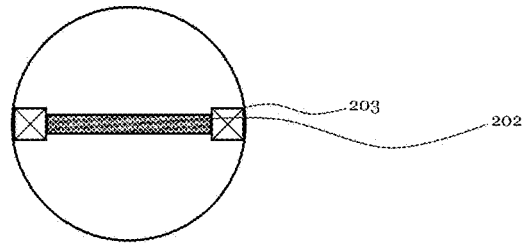
FIG 4D          FIG 4B

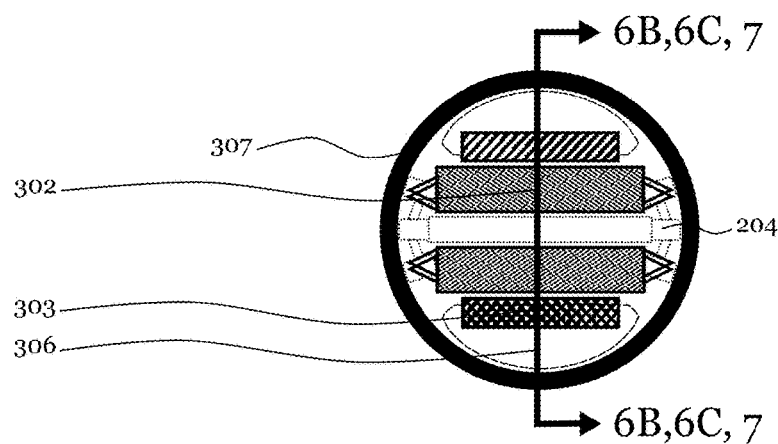
FIG 6A
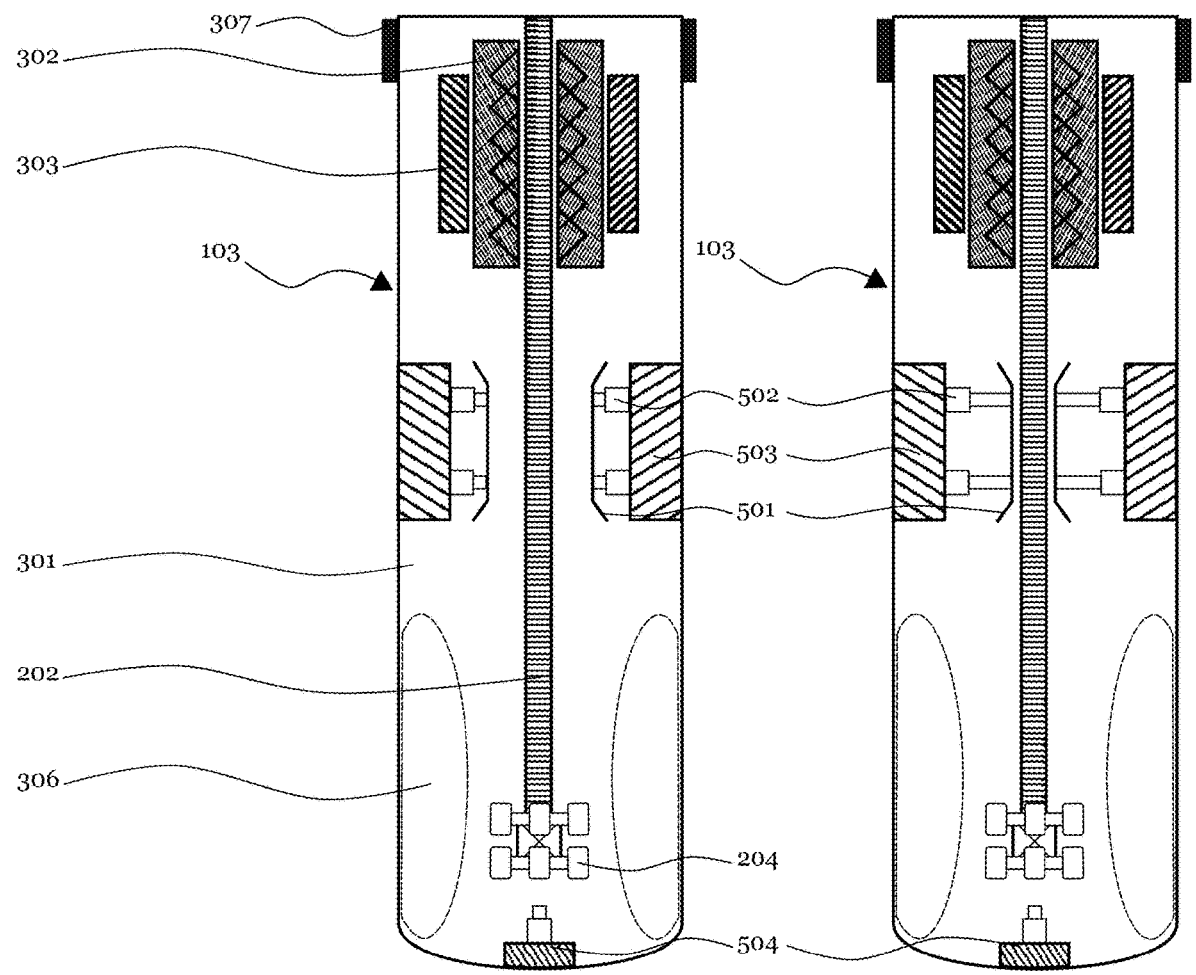
FIG 6B
FIG 6C

FIG 23A
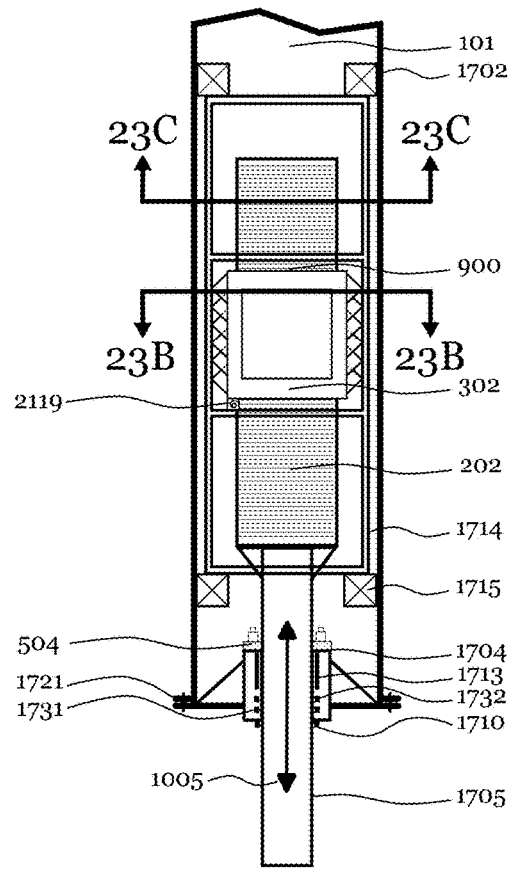
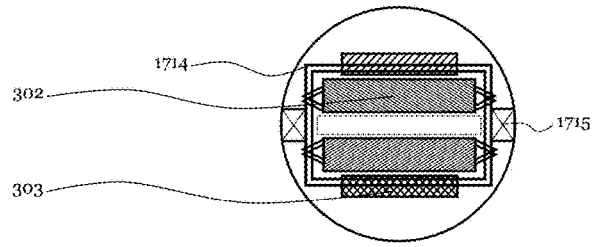
FIG 23B
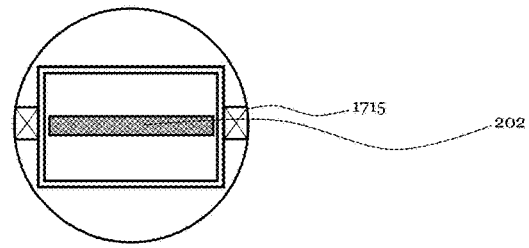
FIG 23C

TWO BODY VARIABLE BALLAST WAVE ENERGY CONVERTER

REFERENCE TO RELATED APPLICATIONS

This application is a continuation-in-part of application Ser. No. 17/860,319 filed on Jul. 8, 2022 entitled LINEAR UNIVERSAL MODULAR ABSORBER FOR WAVE ENERGY CONVERSION which claims priority of U.S. provisional application Ser. No. 63/220,009 filed on Jul. 9, 2021 entitled LINEAR UNIVERSAL MODULAR ABSORBER FOR WAVE ENERGY having a common assignee with the present application, the disclosures of which are incorporated herein by reference.

FIELD AND BACKGROUND OF THE INVENTION

Field. The present invention relates to the extraction of electrical power from a linear oscillatory mechanical input with multiple frequency components, more specifically a wave energy converter (WEC) utilizing a modularized linear absorber unit extracting power from the relative motion of two bodies.

Description of the Related Art. There is a vast resource of energy within the world's oceans. The movement of water in the world's oceans creates an enormous store of kinetic energy, or energy in motion. This energy is embodied in currents, thermal gradients, or as is of principal interest of this invention, wave motion. A device capable of economically extracting the energy of ocean waves would be capable of providing a significant portion of the world's energy needs if widely deployed. Experimental devices exist and are known as Wave Energy Converters (WECs).

A WEC Power Take-off (PTO) is the means of extracting mechanical energy from the ocean and converting it into electrical energy. Such a system includes both software (controls) and hardware (gearboxes, linkages, powertrains, generators, etc.). WECs have often been equipped with relatively simple controllers, providing a mechanical damping coefficient to maximize power from the dominant wave frequency only. On the hardware side, WEC PTOs often implement hydraulics as a method of transmitting and converting linear motion induced by wave energy extraction.

Wave Energy Converters face significant technical and economic challenges because wave energy, unlike other renewables, must be collected from an extremely dynamic resource. Ocean waves are not a simple, single frequency wave, but rather the superposition of countless frequency and amplitude waves. As a result, a Wave Energy Converter must be able to extract energy efficiently from a wide frequency spectrum and change operating conditions on a second or sub-second time scale for maximum energy extraction.

The WEC PTO encompasses the most technically challenging portion of WEC engineering. Beyond the PTO system, a WEC simply needs relative motion between two bodies to provide an actuation force. If a modularized PTO system were to be designed that would be universally applicable for a wide range of possible relative mechanical motions, this linear module would serve to drastically reduce engineering and design within the sector as various means of mechanical interaction with waves could be readily explored without redundant engineering efforts related to the core PTO system.

SUMMARY

The implementations disclosed herein provide a linear, universal modular absorber for wave energy conversion. A linear module includes an actuated subassembly and a reference subassembly, containing a direct drive linear machine for converting linear mechanical motion into electrical energy. The linear module may be used between any two oscillating mechanical bodies, exploiting their relative motion, and adapting to the mechanical characteristics of a larger system in which it is deployed.

In one implementation for a wave energy conversion system the linear module provides a means of energy conversion between the reference seabed and the wave excited motion of a floating body affixed to the actuated subassembly. The linear module provides mechanical stiffness, power maximizing control, and electrical energy conversion, while an actuating body provides an input force, in this case the buoyancy and hydrodynamic excitation through the drag of floating body in the wave orbital.

BRIEF DESCRIPTION OF THE DRAWINGS

The present invention may be better understood, and its numerous features and advantages made apparent to those skilled in the art by referencing the accompanying drawings. For ease of understanding and simplicity, common numbering of elements is employed where an element is the same in different drawings.

FIG. 4A is a lateral cross section showing the layout within the actuated subassembly;

FIG. 4B is a longitudinal cross section of the actuated subassembly on line 4B-4B;

FIG. 4C is a lateral cross section showing the layout within the reference subassembly;

FIG. 4D is a longitudinal cross section of the reference assembly on line 4D-4D;

FIG. 6A is a longitudinal cross section of the linear module;

FIG. 6B is a lateral cross section of the linear module along line 6B-6B showing the linear braking system in an inactivated state;

FIG. 6C is a lateral cross section of the linear module along line 6C-6C showing the linear braking system in an activated state;

FIG. 23A is a cross section for the alternative implementation of the two-body wave energy converter showing details of the linear electric machine;

FIGS. 23B and 23C are sections of the two-body wave energy converter along sections lines 23B-23C and 24C-24C showing details of the linear electric machine;

DETAILED DESCRIPTION

The following is a detailed description of illustrative implementations of the present invention. As these implementations of the present invention are described with reference to the aforementioned drawings, various modifications or adaptations of the methods and or specific structures described may become apparent to those skilled in the art. All modifications, adaptions, or variations that rely upon the teachings of the present invention are considered to be within the spirit and scope of the present invention. For example, the device set forth herein has been characterized as a linear, universal, modularized absorber for wave energy conversion, but it is apparent that other uses may be found for this device. Hence, these drawings and descriptions are not to be considered in a limiting sense as it is understood that the present invention is in no way limited to the implementations illustrated.

Figure 1:
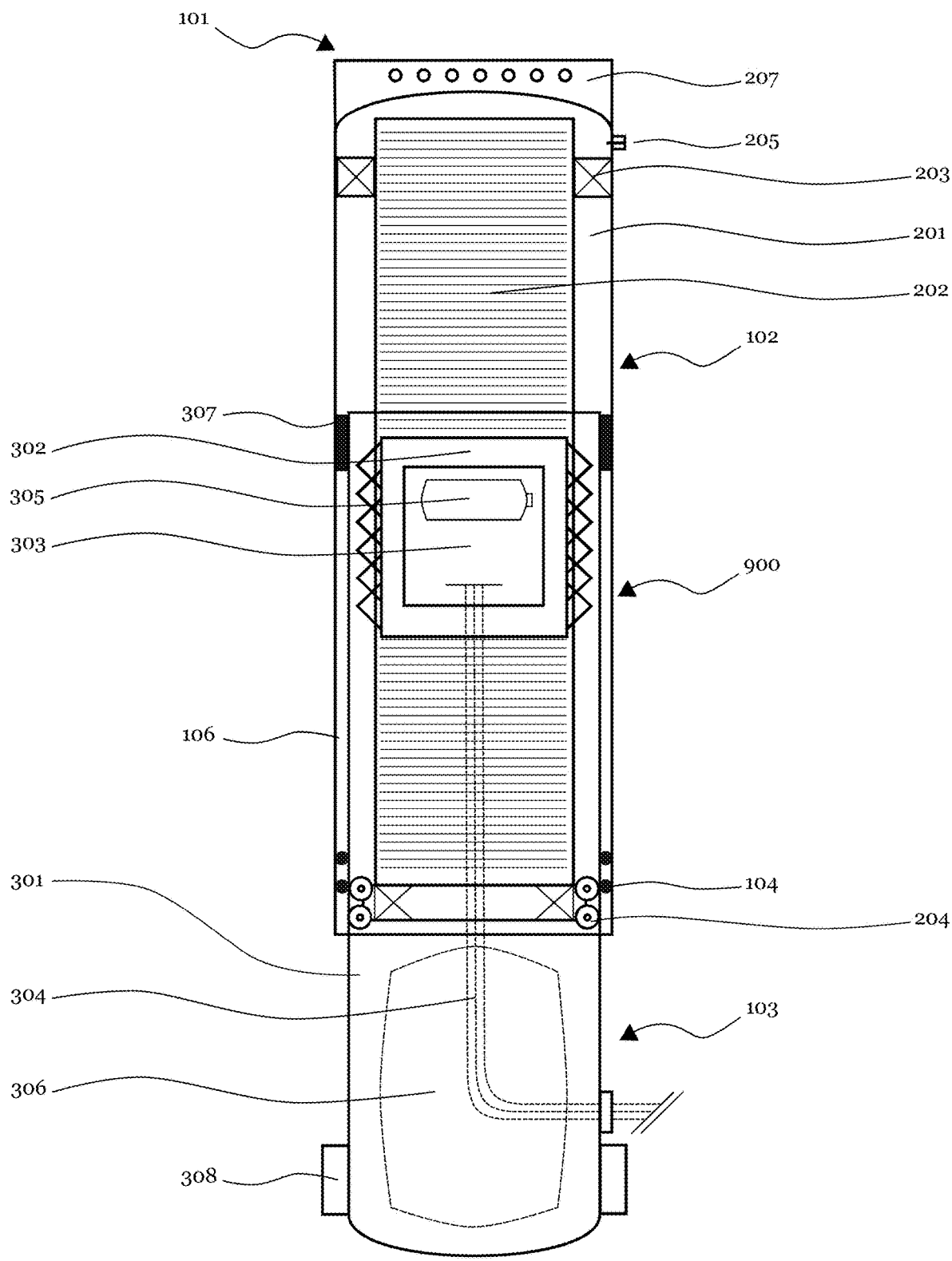
FIG. 1 is an overview of the linear module with the two main subassemblies.
Figures 2A, 2B, 2C:
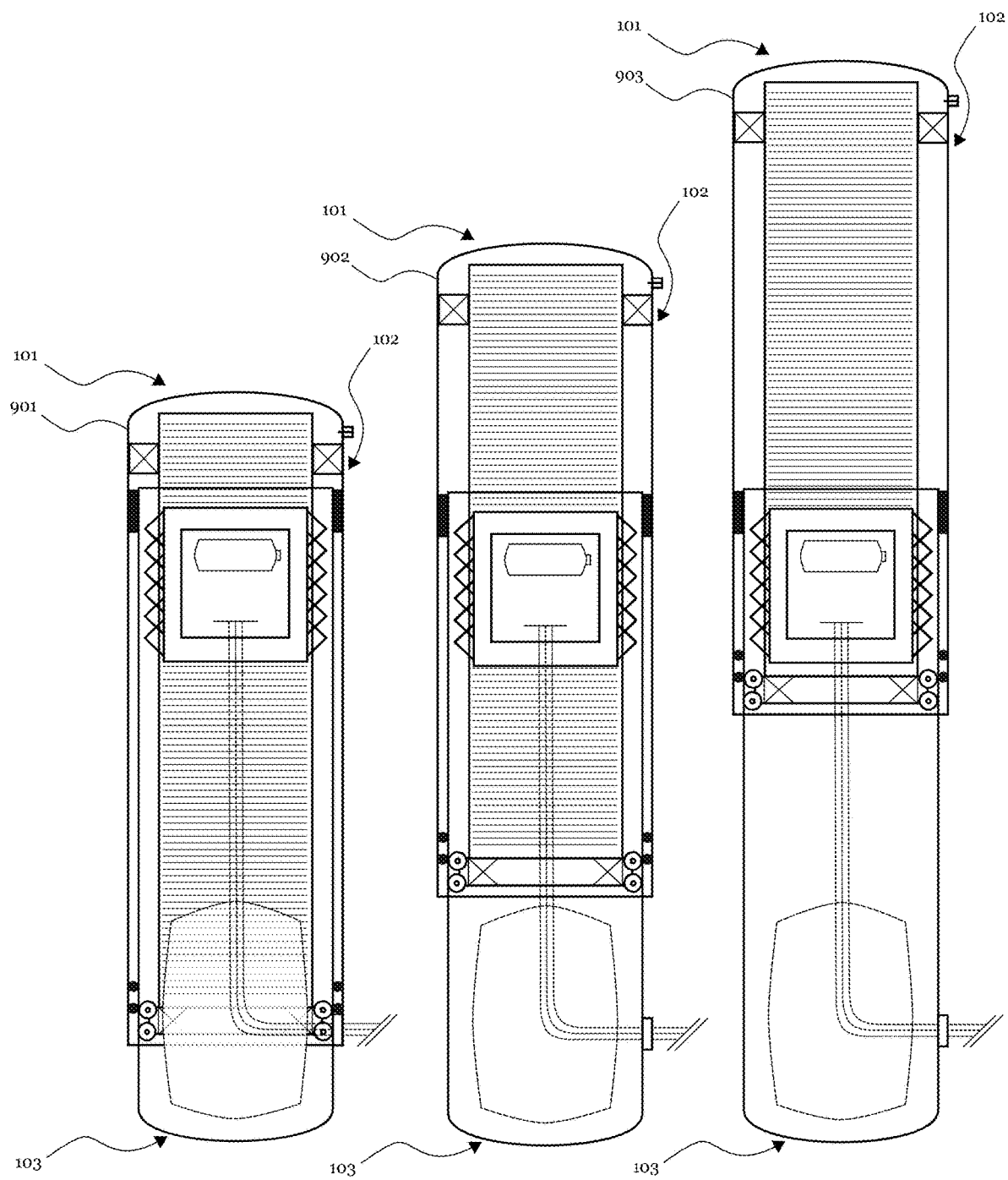
FIG. 2A is a depiction of the linear module showing a retracted position during a range of motion of the module.
FIG. 2B is a depiction of the linear module showing a mid-stroke position.
FIG. 2C is a depiction of the linear module showing an extended position.

The implementations presently disclosed provide a linear, universal, modularized absorber for wave energy conversion. For purposes of illustration, an example implementation of a linear module 101 is presented in in FIG. 1. The linear module 101 has two main subassemblies, an actuated subassembly 102, and a reference subassembly 103. The actuated subassembly 102 concentrically receives the reference subassembly 103 and the actuated subassembly and reference subassembly are configured to telescopically reciprocate longitudinally relative to one another as shown in FIGS. 2A-2C to provide a range of relative motion or stroke between the actuated assembly and the reference assembly with a compressed position 901 shown in FIG. 2A, a midstroke position 902 shown in FIG. 2B and an extended position 903 shown in FIG. 2C. The linear module 101 can therefore contract or extend depending on the reciprocation of the actuated assembly 102 and the reference assembly 103 as driven by an external actuation force or a direct drive linear electric machine, having an active stator 302, and a passive translator 202, contained within the linear module 101.

As seen in detail in FIGS. 4A and 4B, the actuated subassembly 102 includes an actuated shell 201, containing the aforementioned passive translator 202, which is attached to the actuated shell via an adaptive static mount 203. The static mount 203, allows for fixed positioning of the actuated end of the translator 202 to the actuated shell 201, while being compliant to vibration and a small amount of rotation through a compliant mechanism employing elastomer bushings or spring-damper suspension components. Proximate a terminating end of the actuated shell 201, the translator 202 is supported by a rolling bearing assembly 204 similarly mounted to the translator in a compliant manner. This bearing assembly 204 is configured to roll along an inner surface of a reference shell 301 to support the translator 202 as the actuated subassembly 102 is extended and contracted during operation.

As seen in detail in FIGS. 4C and 4D, the reference subassembly 103 is mechanically contained within the reference shell 301, and includes an active stator 302. While a circular lateral cross section is shown for the actuated shell and reference shell in the example implementations, other geometric configurations may be employed. The active stator 302, when coupled with the passive translator 202, results in a linear electric direct drive (LEDD) machine 900 such as a Vernier Permanent Magnet Linear Generator disclosed in U.S. Pat. Nos. 10,865,763 and 10,871,141 having a common assignee with the present application, the disclosures of which are incorporated herein by reference, enabling electrical power extraction and/or mechanical power actuation. The LEDD machine 900 is driven by a power electronics package 303, which is configured to send current to or receives current from the active stator 302. The power electronics package 303 is connected through power cables 304 to the grid or a larger power system. The actuated shell 201 and the reference shell 301 cooperatively form a chamber 106 having a varying volume which expands or contracts responsive to the relative reciprocal motion of the actuated subassembly 102 and the reference assembly 103.

As the actuated subassembly 102 and the reference subassembly 103 move longitudinally relative to each other, low friction slides 307 attached to the outer surface of the reference shell 301, interfacing with the inner surface of the actuated shell 201 are configured to constrained lateral motion. A system of seals 104 located between the inner surface of the actuated shell 201 and the outer surface of the reference shell 301 prevent ingress of external water into and maintain pressurization of the chamber 106 of the linear module 101 as imparted by a pressurization system 401 including the seals 104, one or more pressurized gas canisters and associated manifolds 305, one or more passive pressure compensating bladders 306, and one or more pressure bleed values 205. The pressurization system 401 is configured to maintain or modify pressure within the chamber 106 as will be described in greater detail subsequently.

Figure 3:
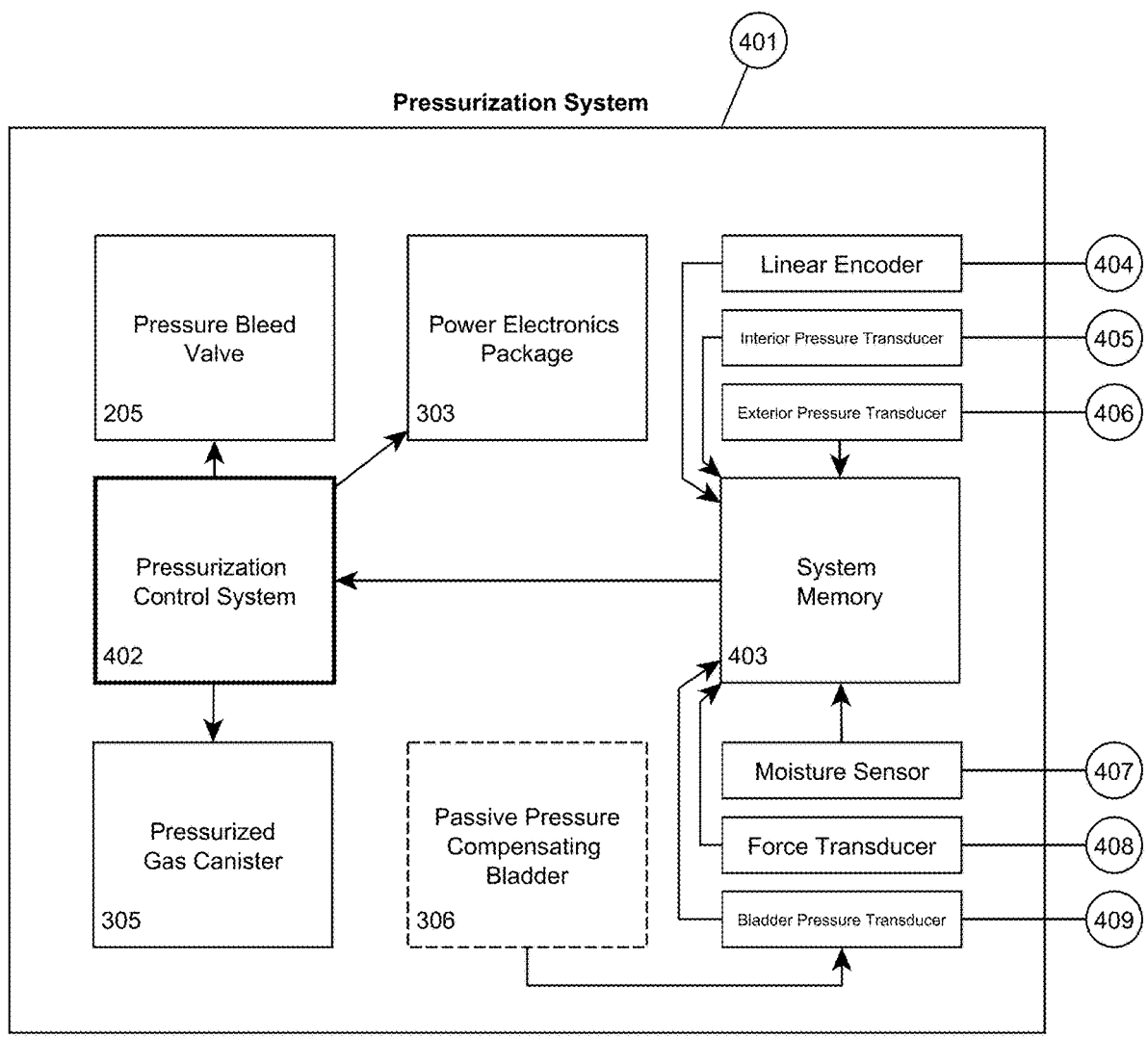
FIG. 3 is a diagram of the pressurization system.

The pressurization system 401 is presented as a flow diagram in FIG. 3. The pressurization control system 402, a microprocessor with control code stored in memory, directly controls the pressurized gas canister 305, containing inert gas such as nitrogen, to increase pressure, the pressure bleed valve 205 to decrease pressure, and the power electronics package 303, to extend or retract the LEDD machine 900, altering the internal volume of linear module 101. Feedback is provided to the pressurization control system 402 directly from sensors (to be described subsequently) and from a time history of sensor readings stored in system memory 403. These feedback sensors include a linear encoder 404, providing the linear position of the stroke of module 101, which can be used to calculate internal volume of the chamber 106 given the known cross-sectional area of the module. An interior pressure transducer 405 provides interior pressure feedback to the control system, while the exterior pressure transducer 406 provides the external pressure. For the example implementations, the exterior pressure would be the hydrostatic pressure of the surrounding seawater. The difference between the interior pressure transducer 405 and the exterior pressure transducer 406 is the pressure differential. The pressure differential relates to the restoring force of the innate air spring properties of the linear module 101. Further, a force transducer 408 is integrated into the system between the actuated shell 201 and the passive translator 202, embedded within the static mount 203. In some implementations, the force transducer 408 may be a self-contained unit, in alternative implementations the force transducer may be strain gauges installed within the static mount 203 structure. The force transducer is a secondary means of monitoring the pressure differential between internal and external pressure, as the restoring force is generally proportional to the pressure differential excluding some mechanical losses such as friction. The pressurization system 401 also includes one or more moisture sensors 407, located in a lower portion of the of the linear module 101. The moisture sensor detects water ingress into the system, reporting back to the pressurization controller. Water ingress is a failure mode of the linear module 101, and as such, a mitigation procedure is required. When the moisture sensor 407 detects water ingress, the pressurization control system 402 will attempt to increase pressure reversing the water flow and keeping the internal components dry until a maintenance team can address the leak. In some implementations, a unidirectional check valve may be installed in the wall of one or both of the actuated shell 201 or the reference shell 301 to drain water from the internal volume given a positive pressure differential. Pressure is increased by releasing gas from the pressurized gas canister 305, or retracting the LEDD machine 900 though a command to the power electronics package 303, thereby reducing the interior volume of the linear module 101.

A passive pressure compensating bladder 306 may be employed in the pressurization system 401. This pressure compensating bladder 306 is a flexible bladder made of material such as an elastomer, allowing for a pre-deployment pre-charge to a designated pressure, or alternatively a shell pass-through orifice allowing external hydrostatic pressure to pre-charge. As the pressure varies within the linear module 101, the passive pressure compensating bladder 306 will expand and contract consuming a variable volume within the linear module 101 (or within or integral with a flexible buoy operating as a floating body, as will be described in greater detail subsequently), and thereby mitigating the pressure difference due to volumetric changes between fully retracted position as seen in FIG. 2A, and a fully extended position as shown in FIG. 2C. The passive pressure compensating enables greater flexibility in the geometric properties of the linear module 101 as longer, smaller diameter actuated and reference shells 201/301 with a long stroke would result in large pressure variability that would otherwise become a technical challenge for seal 104 design due to a high pressure differential, and would additionally result in higher than desired restoring forces.

Figure 8:
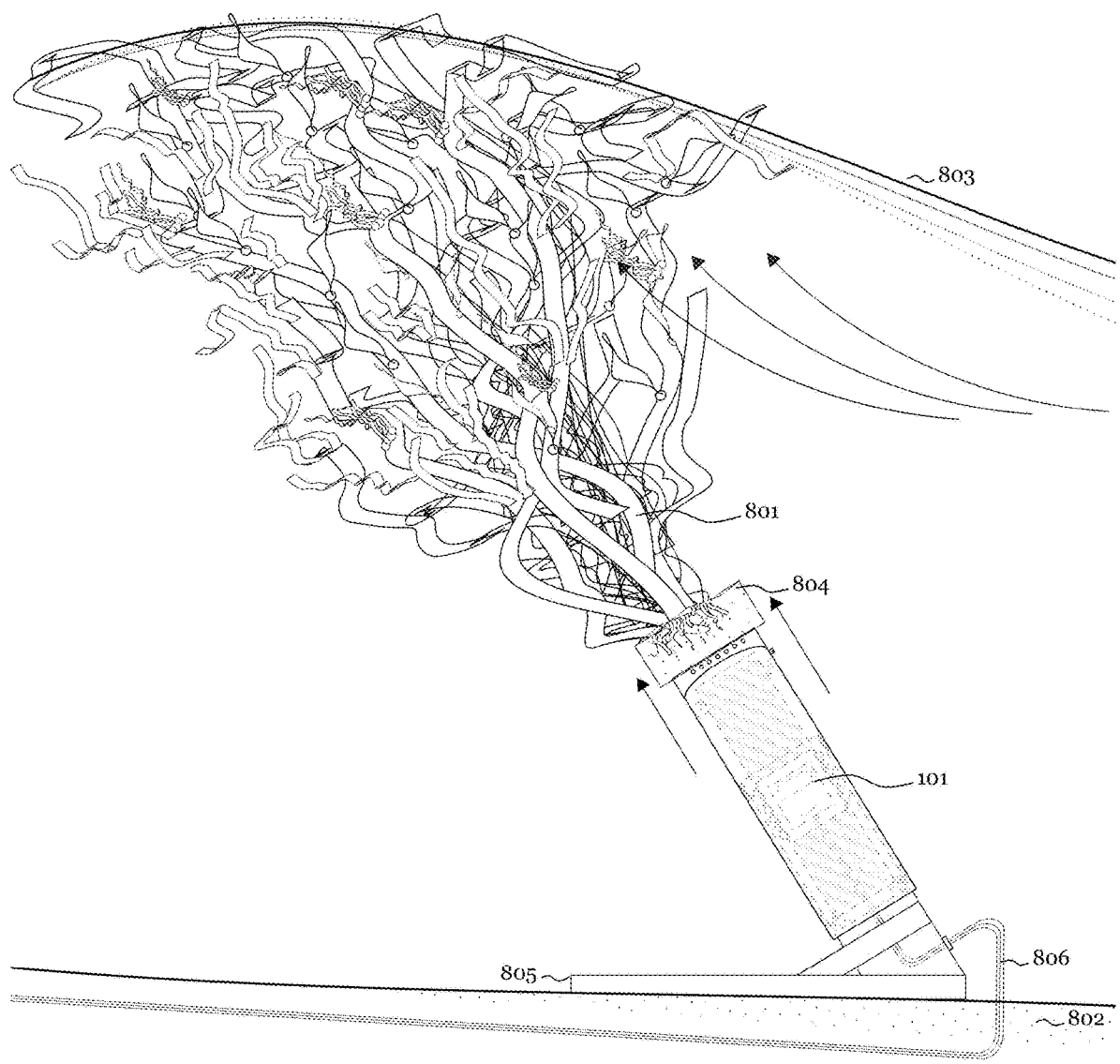
FIG. 8 is an example implementation of the linear module using giant kelp wave interaction as the actuation force.

The pressurization system enables the linear module 101 with an in-built stiffness, as the linear module becomes an air spring. Compressing the linear module 101 to a retracted position as shown in Figure. 2A increases the pressure of the gas inside the chamber 106 to a point greater than the external hydrostatic pressure, resulting in a restoring force to a mid-stroke equilibrium position seen in FIG. 2B. In contrast, extending the linear module 101 to an extended position as shown in FIG. 2C, expands the contained gas to a lower pressure than the external hydrostatic pressure, again resulting in a restoring force, this time in the opposite stroke direction, but still resulting in the resolution of equilibrium at a point. The stiffness resulting from the linear module 101 geometry, actuation, and pressurization system, enhances harmonic excitation potential of the system. For any linear oscillatory system to function as an energy absorber, a restoring force is required. Building a tunable restoring force into the linear module 101 allows for utilization of this linear module 101 as a wave energy converter when coupled with mechanical bodies that impart forces exclusively or primarily resulting from drag rather than a combination of drag and buoyancy. In other words, high drag, low buoyancy mechanical bodies, such as will be presented in FIG. 8 are enabled by this invention, where they would otherwise be difficult to implement due to a lack of restoring force.

In addition to the stiffness imparted by the variable volume feature of the linear module 101, the volume changes during expansion and contraction of the linear module 101 results in varying buoyancy. This variable buoyancy may be exploited for installation and recovery in addition to tuning the module for reaction to the wave state. For installation, the LEDD machine 900 retracts, compressing the linear module 101 to minimum volume resulting in negative buoyancy. The linear module will sink to an installation depth on a seabed 802 or similar surface, where the linear module may be automatically pressurized via the compressed gas canister and manifold 305 to match hydrostatic pressure. For retrieval, the LEDD machine 900 extends, expanding linear module 101 to maximum volume 903 resulting in positive buoyancy. The linear module will float to the water surface for retrieval and tow. The linear module may automatically bleed pressure through the valve 205 to equalize with hydrostatic pressure as it raises in the water.

Figure 5A:
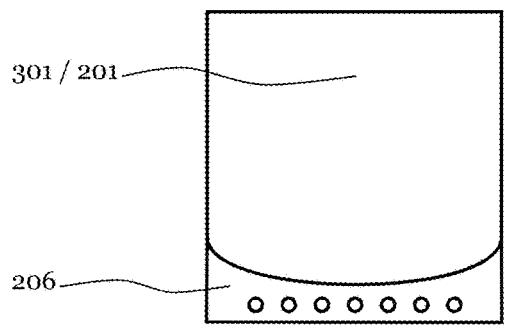
FIGS. 5A-5D are depictions of four mechanical connection mechanisms that may be employed for constraining the reference assembly.
Figure 5B:
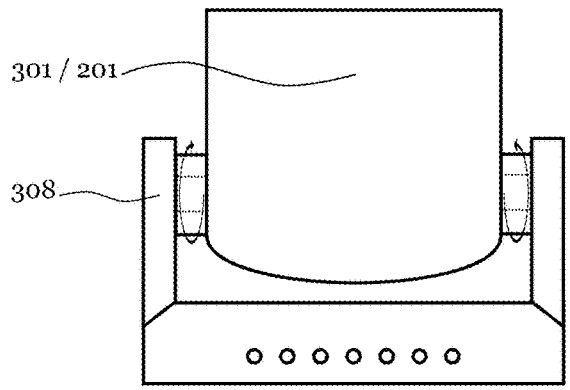
Figure 5C:
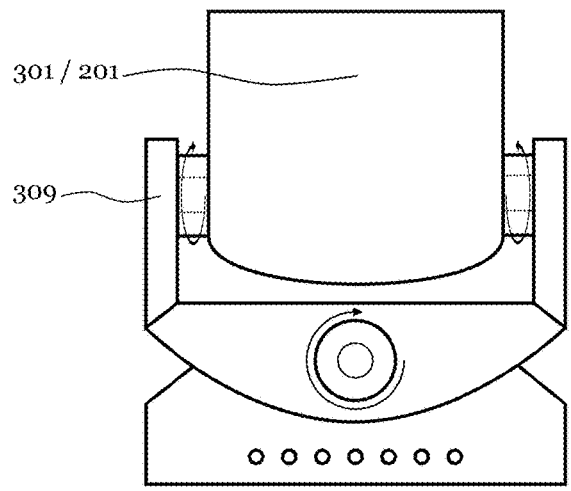
Figure 5D:
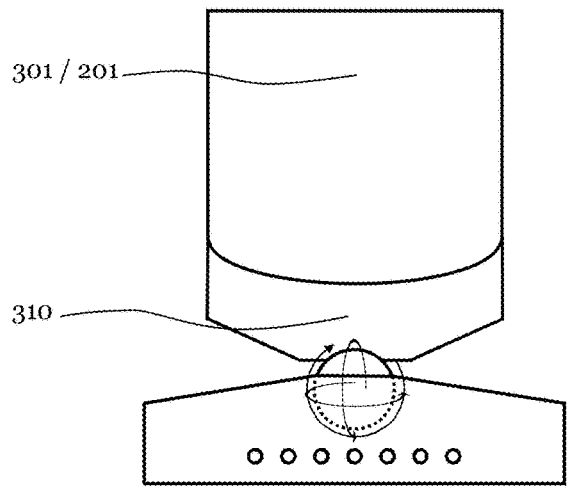

The linear module 101 is mechanically fixed with a connector to a reference mechanical body (e.g. the seabed 802) via a lower connection 206 (as seen in FIG. 5A) integrated with the reference shell 301. Meanwhile the actuated shell 201 is fixed to an actuating body (e.g. a buoy), as will be described in greater detail subsequently, via an upper connection 207 (as seen in FIG. 1). There are several mechanical connector options depending on the application, these are presented in FIGS. 5A-5D. The simplest mechanical connector is a bolted flange connection as shown in lower connection 206 in FIG. 5A, which constrains the motion of the attached actuated or reference shell 201/301 to zero degrees of freedom relative to the reference or actuating body. Differing degrees of freedom are available through the selection of alternate connection mechanisms such as a one degree of freedom hinged connector 308 as shown in FIG. 5B, which provides either pitch or roll independence of the shell. Similarly, a two degree of freedom hinged connector 309 as seen in FIG. 5C may be employed for greater compliance allowing simultaneous pitch and roll rotation. Finally, a three degree of freedom connector 310 as seen in FIG. 5D may be selected for pitch, roll, and yaw compliance. The mechanical connection options may be employed in any combination on the actuated and reference shells given the desired design specified compliance.

To mitigate loads related to end of stroke impact within the linear module, several braking methods may be implemented within the system. The LEDD machine 900 may actively brake by applying current from the power electronics package 303 to the active stator 302, electromagnetically coupling with the passive stator 202, producing a thrust force in the opposite direction of the activation. Optionally, the stator 202 phases may be intentionally shorted producing a passive electromechanical brake. Should the linear module 101 be extended or contracted fully despite mitigation taken by the power electronics 303 and stator 302, an emergency end stop 504 will be contained within the reference shell 301 and actuated shell 201, damping the impact of maximum stroke excursion as shown in FIGS. 6B and 6C. This emergency end stop 504 may be an air-spring, a mechanical compression spring, or simply a body made of a compliant elastomer material.

Figure 7:
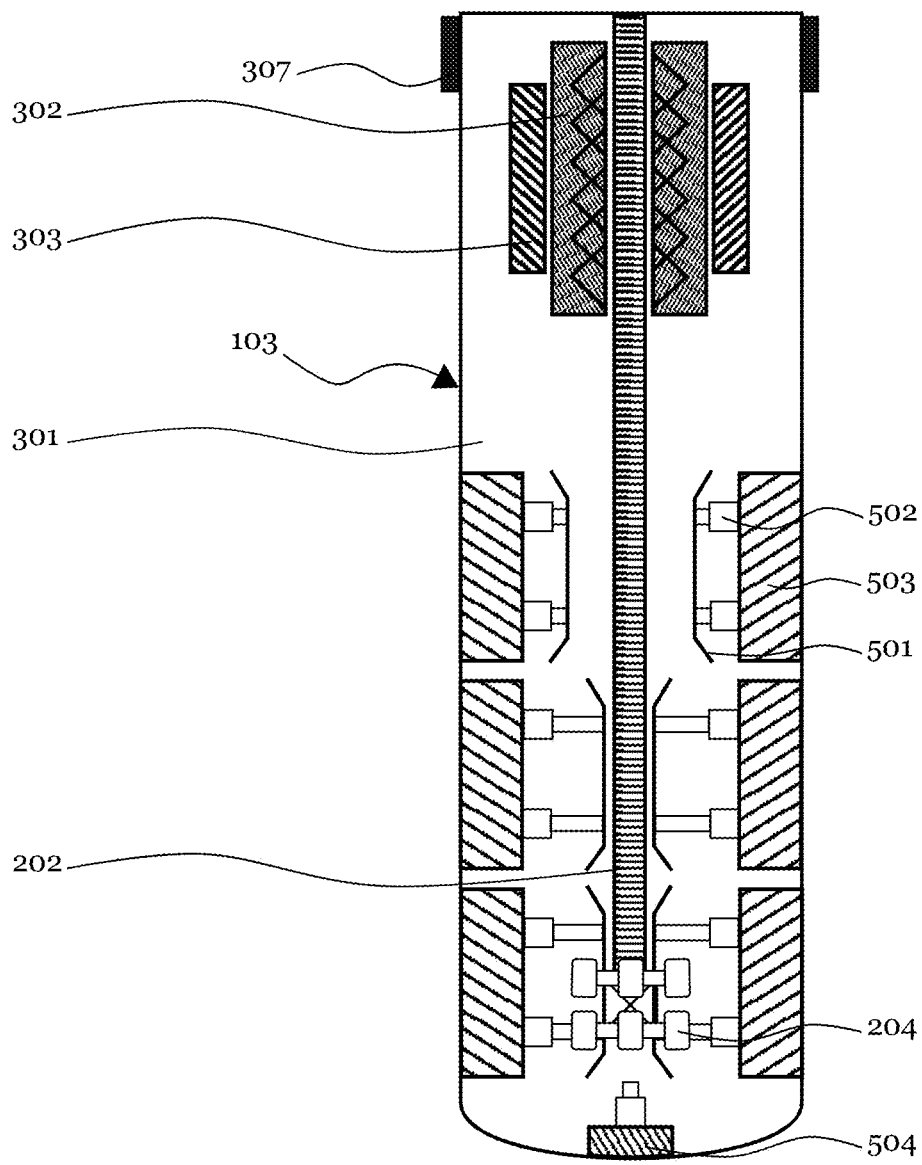
FIG. 7 is a lateral cross section of the linear module along line 7-7 depicting the linear braking system implemented as an array.

In some applications of the linear module 101, additional electromechanical braking capability may be desired. For this purpose, eddy current brakes may be installed within the machine as shown in FIGS. 6A and 6B. The eddy current brake employs opposing conductive flat plates 501 (e.g. aluminum) of width similar to that of the translator, brake actuators 502, or system of linear actuators affixed to the above flat plate producing a motion orthogonal to the surfaces of the translator 202, and mechanical mounts 503 coupling the brake actuator to a frame or other structure in the reference shell 103. In the implementation shown, opposing brakes are shown. When braking is desired, the brake actuators 502 engage, pushing the flat conductive plates 501 forward towards the opposing surfaces of the moving translator 202. As the translator 202 contains permanent magnets, the changing polarity of the magnetic field observed by the flat conductive plate 501 results in eddy currents within the plate, resulting in an electromechanical damping effect, converting translator 202 kinetic energy into heat within the flat conductive plate 501, slowing translator 202 and thus the entire linear module 101 stroke prior to the end limit. This eddy current braking module may be implemented as an array of brake modules in the stroke direction as shown in FIG. 7. Implementing an array of brake modules allows for actuation of some brake modules but not others, resulting in a variable, programmable, free-stroke of the linear module as the translator 202 will reach each brake module sequentially through the stroke. Alternatively, the flat conductive plates 501 may be affixed to the surface of the pressure compensating bladder 306, replacing the actuator 302, allowing for passive actuation of the eddy current brake when the linear module is fully extended to maximum volume 903 and the pressure compensating bladder 306 is fully inflated, pushing the flat conductive plate 501 towards the translator 202.

The linear module 101 is universally applicable to a multitude of mechanical actuation means. Wave energy can be imparted upon bodies in the ocean in a variety of ways, through buoyancy forces, hydrodynamic excitation, sub-surface wave orbitals, radiation forces from nearby bodies, etc. In order to adapt to the various mechanical excitation means, the linear module 101 will employ reinforcement learning within the high-level control system to allow the controller to adapt to device responses observed within the system, learning to maximize power through experimentation with the individual deployment mechanics without full understanding of the larger system in-which is it installed, despite the fact that the larger system may vary widely.

To illustrate the variety of applications available for activating the actuated subassembly 102, in one implementation, a wave energy converter system is created when the linear module 101 is affixed to the seabed 802 on the reference subassembly 103 side, while the actuated subassembly 102 is affixed to an artificial holdfast 804 in which giant kelp (*Macrocystis pyrifera*) 801 is rooted and grown as shown in FIG. 8. The artificial holdfast 804 is a concrete, ceramic, or otherwise rock-like structure which is porous enough to enable kelp 801 to take root on the structure, allowing for pre-seeded artificial holdfast 804 and mature kelp 801 modules to be affixed to the actuated subassembly 102 at the top of the linear module 101 upon installation, or replaced in the event of a storm breaking a significant number of kelp 801 stalks and or blades. The kelp 801 will extend the entire height of the water column from the top of the linear module 101 to the water surface. The dense growth properties of kelp allow for strong interaction with the waves 802, primarily by means of hydrodynamic drag as waves 803 pass over the surface. This wave interaction will actuate the linear module 101, extending the module, thus generating electricity on the upstroke, which may be exported to an onshore substation via an electrical cable 806. The in-built air-spring effect of the linear module 101 will produce a restoring force, returning the linear module 101 to equilibrium after the kelp 801 actuation. The linear module reaction body will maintain a static position on the seabed by means of gravity anchor, frame, or a combination drag embedment anchor and frame 805 as shown in FIG. 8, where the frame is engaged with the seabed 802 sediment prior to installation, preventing a surge motion of the anchored system in response to wave excitation. While farmed giant kelp is used as the example in this embodiment, numerous biological organisms, whether passively grown, or farmed, may serve this role as a wave activated body for actuation of the linear module. Additionally, the wave activated body may also be a purpose designed mechanical system.

Figure 9:
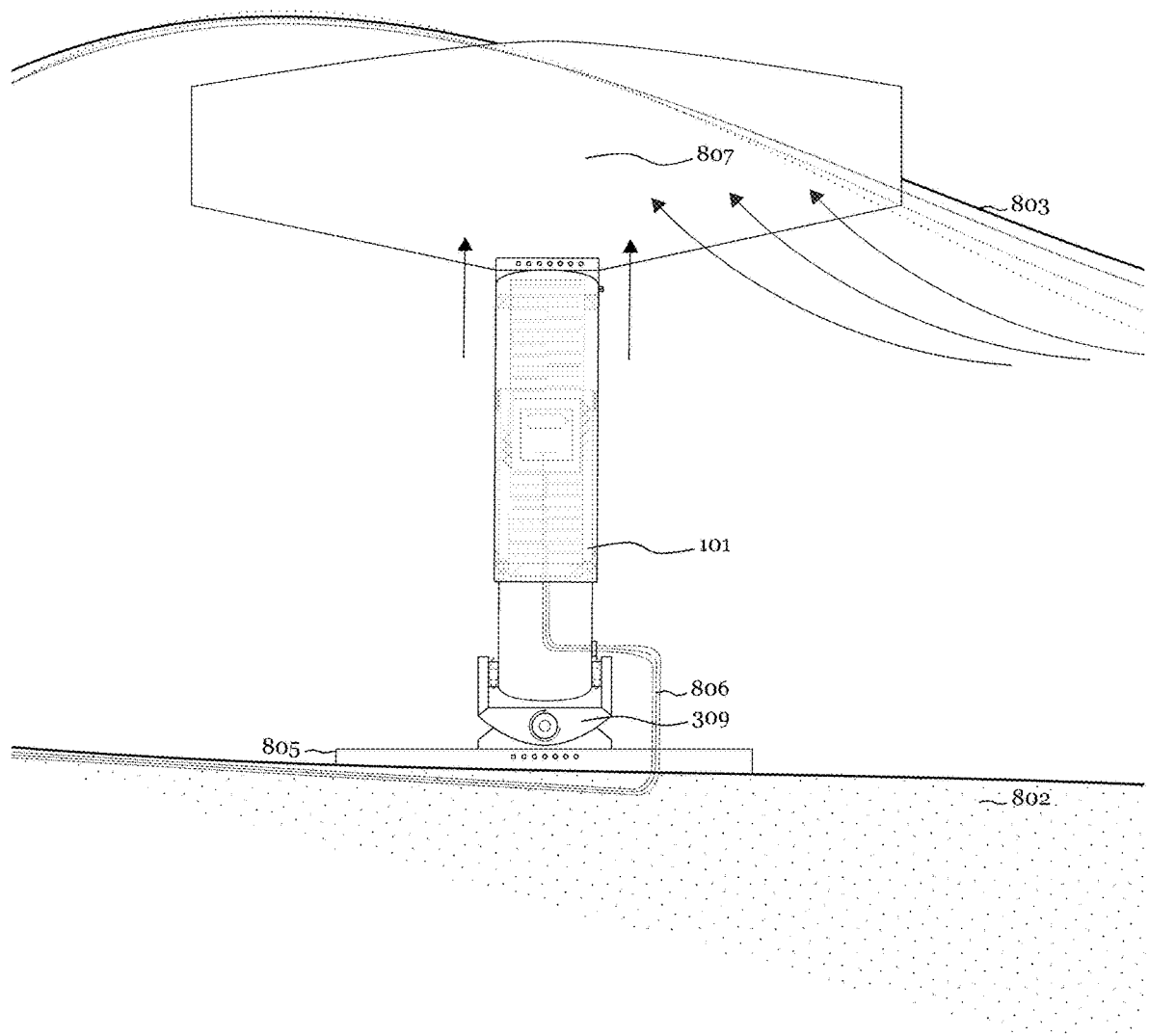
FIG. 9 is an example implementation of a linear module using a buoy as a wave activated body with the seabed as a reference.

In implementations using a mechanical body as the floating buoy, a wave energy converter system, as depicted in FIG. 9, is created when the linear module 101 is directly affixed to the seabed 802 on the reference subassembly 103 side, while the actuated side 102 is affixed to a floating body 807. The floating body drives the actuated subassembly 102 upwards in the heave direction as waves pass, generating electricity on the linear module. Alternatively, as depicted in FIG. 10, the reference subassembly may be a secondary floating body 808, and the connector to the sea floor is a mooring line 809 to the reference body 805 such as a foundation, pile, or anchor, allowing for a compliant reference to the seabed 802, while still capitalizing off the relative motion between the waves 803 and the seabed 802.

Figure 11:
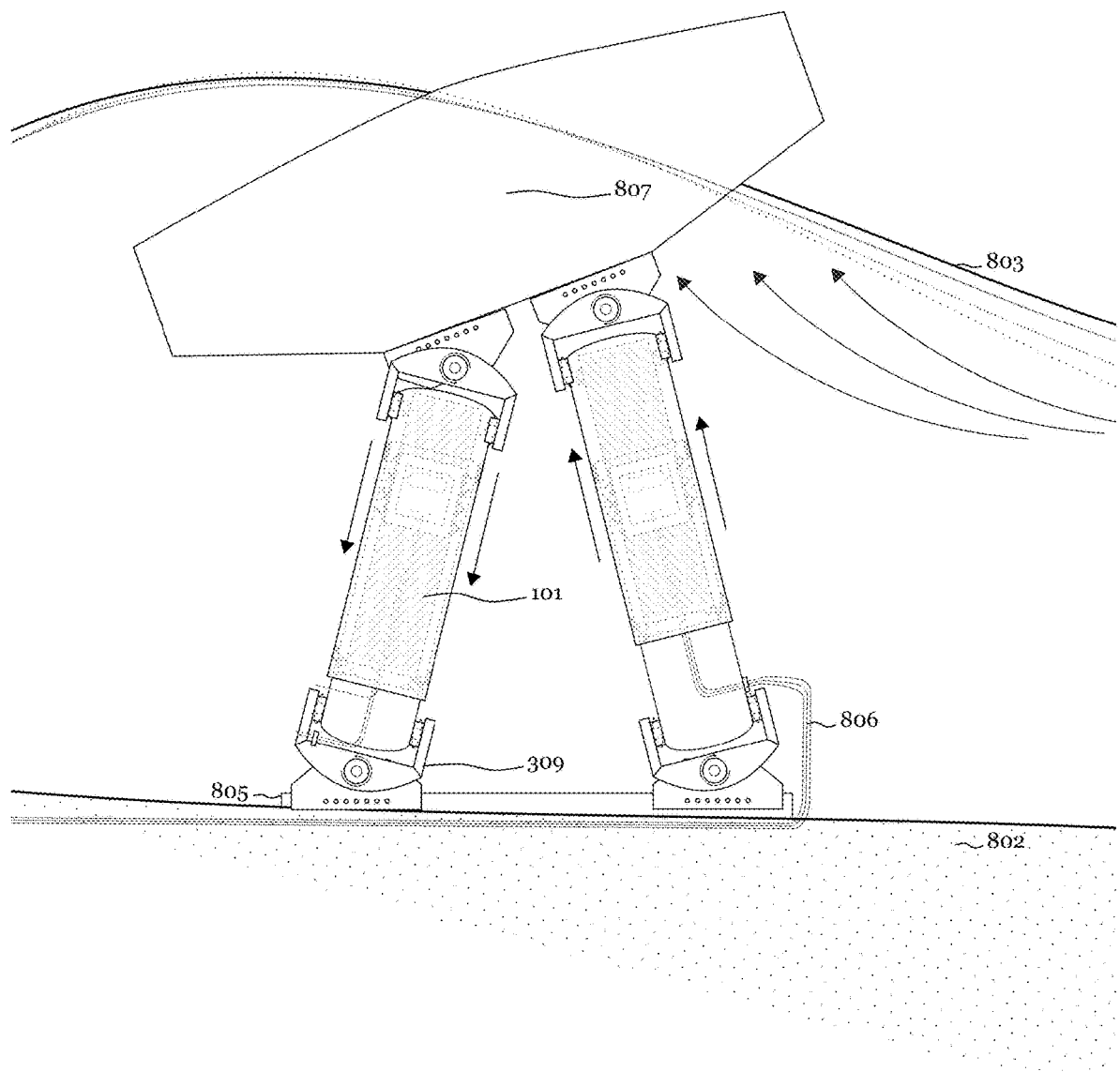
FIG. 11 is an example implementation of an array of linear modules allowing multiple degree of freedom wave energy conversion.
Figure 12:
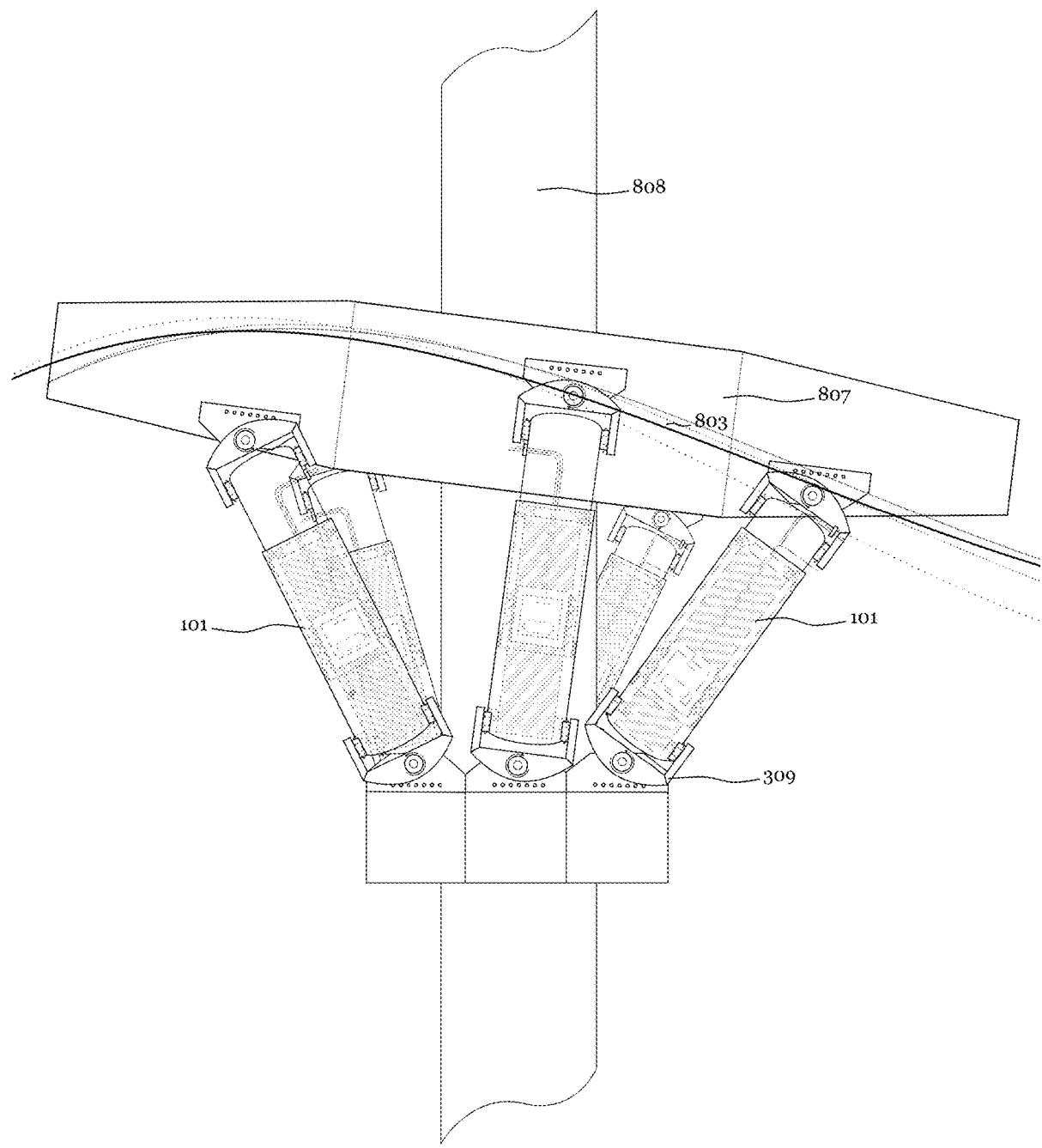
FIG. 12 is an example implementation of linear modules allowing for six degrees of freedom wave energy conversion.

In yet another implementation a pair, or larger array, of linear modules 101 may be employed to create controllable multiple degree of freedom wave energy converters as shown in FIG. 11. Two or more linear modules may be attached to a common foundation or reference body 805 and a shared wave activated floating body 807. The relative linear extension of the linear modules 101 can drive, or be driven in a pitch or roll rotation, while coordinated motion can drive or be driven in a linear heave motion. Taking this concept further, an array of six linear modules 101 would then be capable of driving or being driven in a full six degrees of freedom as shown in FIG. 12.

Figure 10:
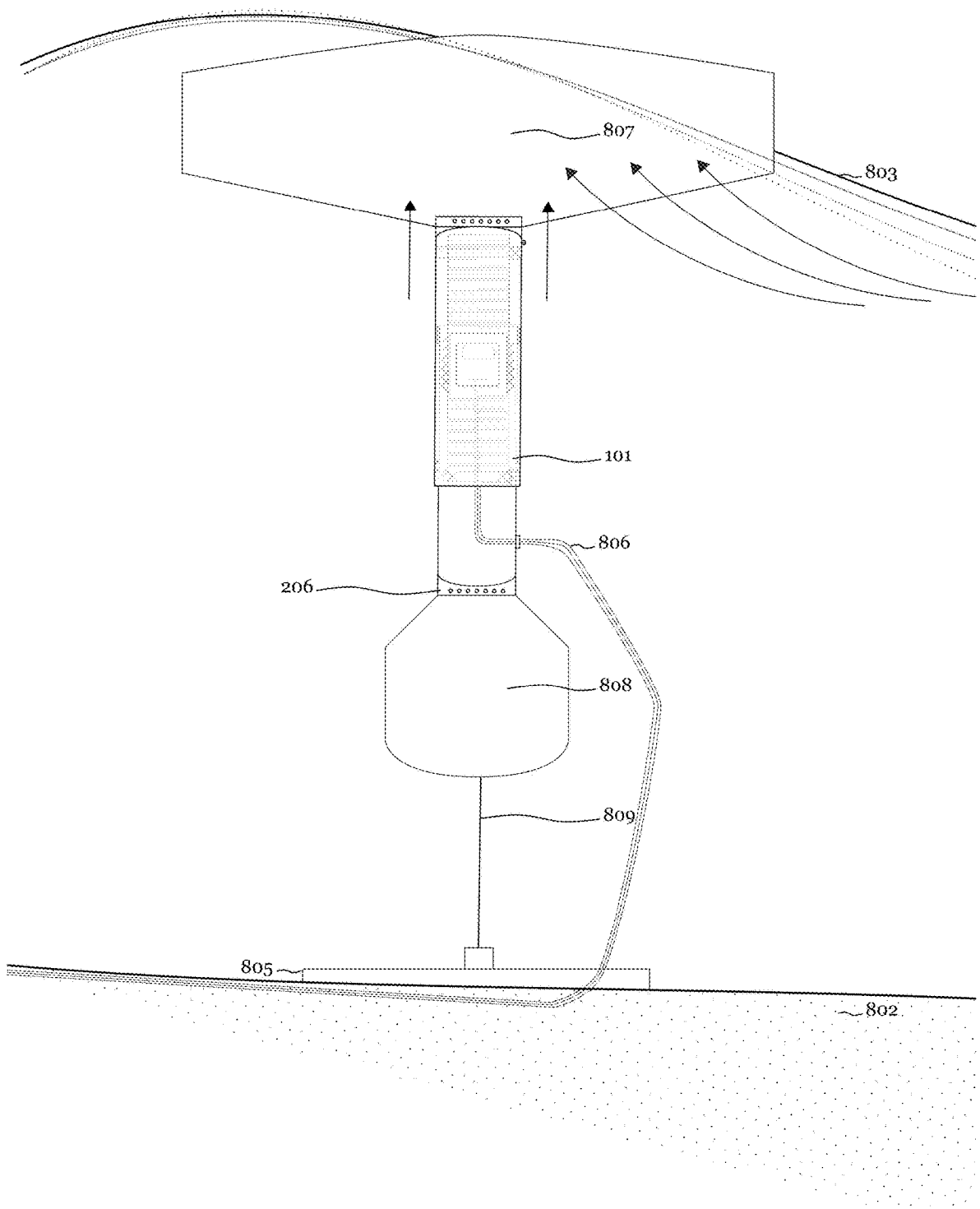
FIG. 10 is an example implementation of a linear module using a buoy as a wave activated body with a buoyant reference structure.
Figure 13:
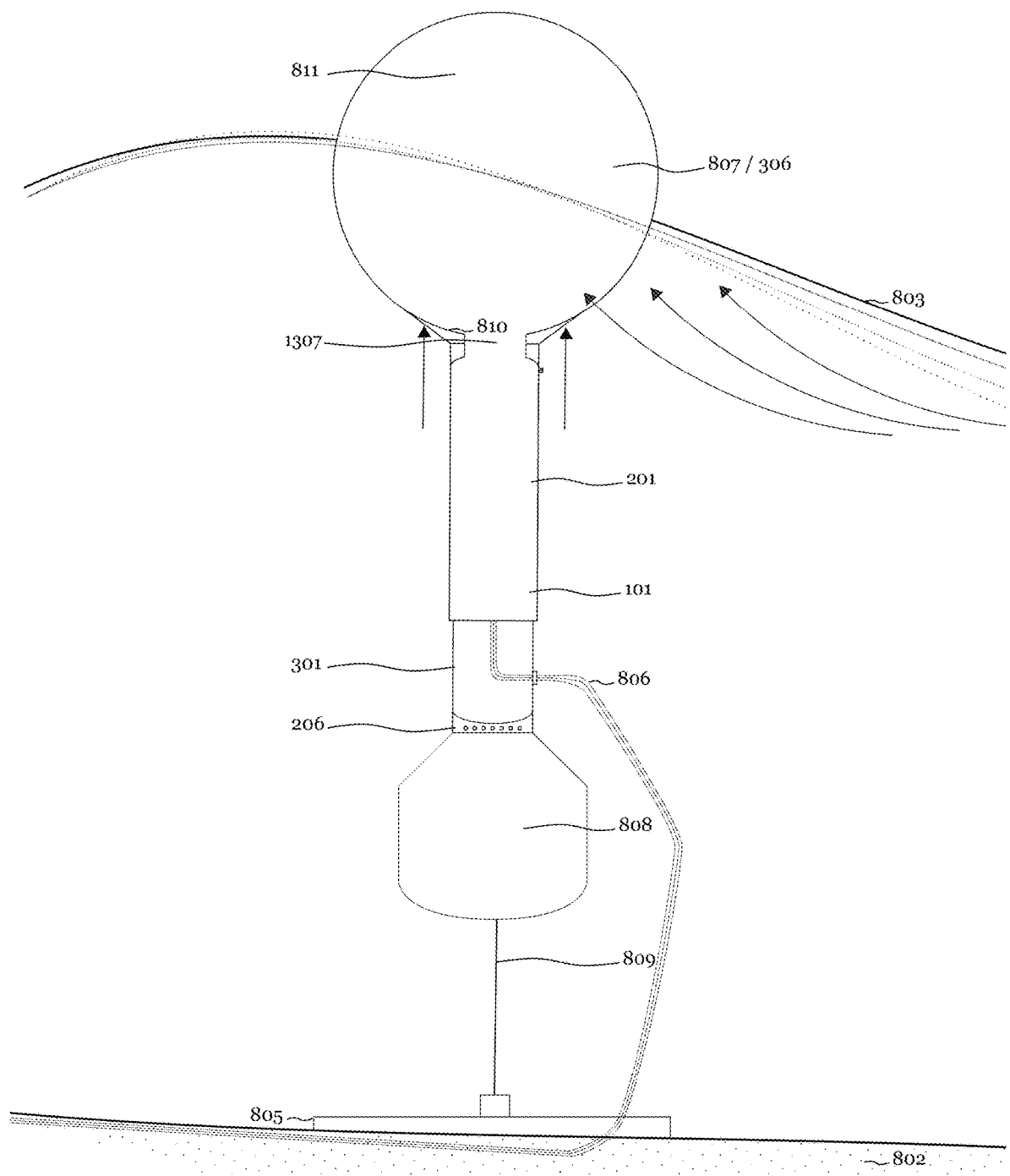
FIG. 13 is an example implementation wherein the pressure compensation bladder is incorporated into an inflatable buoy as the wave actuated body.

As seen in FIG. 13, with an implementation of the reference subassembly as a secondary floating body 808, moored to reference body 805 such as a foundation, pile or anchor, allowing for a compliant reference to the seabed 802, as previously described with respect to FIG. 10, the floating body 807 is configured as a flexible (and inflatable) buoy. The sealed pressure compensating bladder 306 of the initial implementation is replaced by a flexible membrane 810 incorporated within or integral to the floating body 807 maintained in fluid communication with the chamber 106 of the module 101 through a conduit or orifice 1307 between the actuated shell 201 and an expandable volume 811 created by the membrane 810 as a flexible pressurization bladder. As the pressure varies within the chamber 106 of the linear module 101, the expandable volume 811 will expand and contract mitigating the pressure difference between fully retracted position as generally represented in FIG. 2A, and a fully extended position as shown in FIG. 2C and described with respect to passive pressure compensating bladder 306.

In applications where the linear module 101 is expected to maintain a primarily vertical orientation, the pressurization system may be simplified. The linear module 101 may be partially flooded with a liquid such as fresh water, or treated sea water, reducing the requirements of the seals 104 from preventing water incursion, to merely limiting the concentration of particulate matter and salt to enter the module. A reverse osmosis filter and pump system may further be added to the linear module 101 to allow for continuous or intermittent treatment of the internal liquid. In this simplified embodiment of the invention, the pressure compensating bladder 306 may be replaced with a volume of air in the actuated shell 201 (oriented in an upper position with respect to the reference shell 301), which will compress and expand in the same manner as the pressure compensating bladder 306. In this implementation, the power electronics package 303, would be enclosed in a sealed housing in the location shown in the figures, or placed in a separate sealed location.

Figure 14:
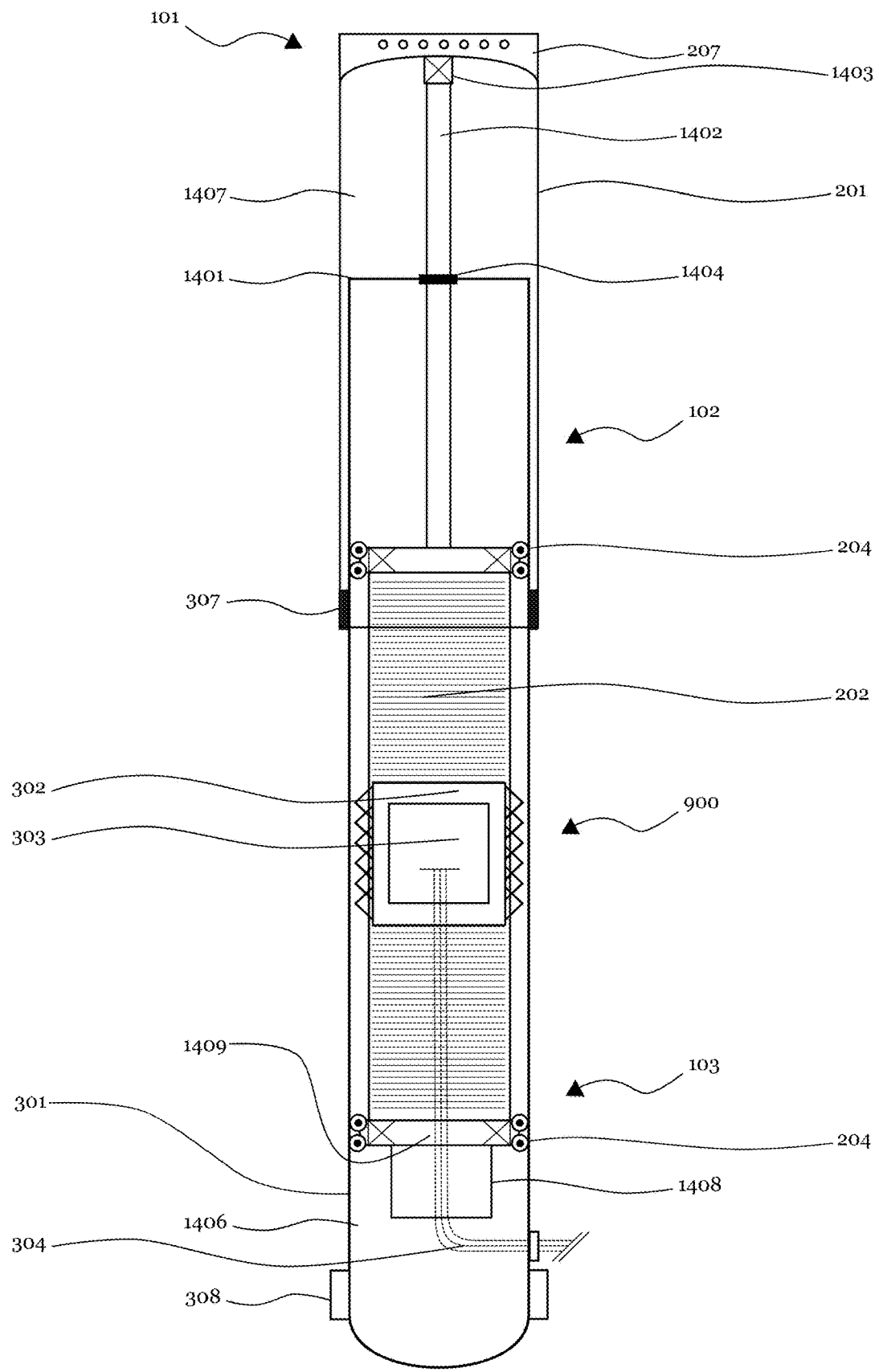
FIG. 14 is an example simplified implementation of the linear module incorporating a support shaft fixing the translator to the actuating shell.
Figures 15A, 15B, 15C:
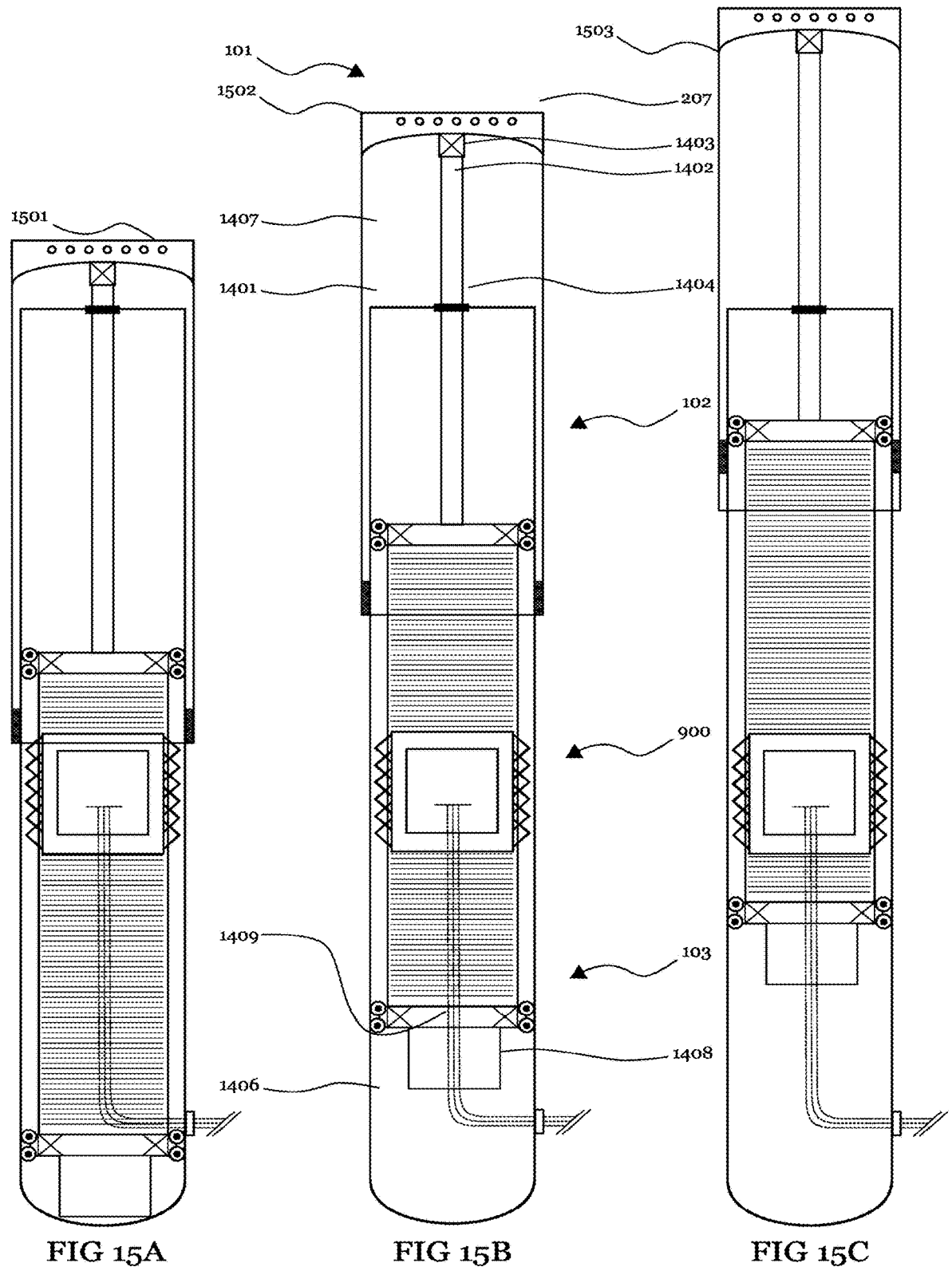
FIG. 15A is a depiction of the simplified linear module showing a retracted position during a range of motion of the module.
FIG. 15B is a depiction of the simplified linear module showing a mid-stroke position.
FIG. 15C is a depiction of the simplified linear module showing an extended position.

As shown in FIG. 14 and FIGS. 15A-15C, in the compressed position 1501 in FIG. 15A, mid stroke position 1502 in FIG. 15B and the extended position 1503 in FIG. 15C, the simplified implementation may alternatively include a constant pressure in the reference shell 301 with an upper bulkhead 1401 creating a lower chamber 1406 housing the passive translator 202. An actuating shaft 1402 attaches the passive translator 202 to a static mount 1403 on the actuated shell 201 transitioning through a seal 1404 in the upper bulkhead 1401. An upper chamber 1407 in the actuated shell 201 provides the volume of air in the actuated shell 201 (oriented in an upper position with respect to the reference shell 301), which will compress and expand in the same manner as the pressure compensating bladder 306. The upper chamber 1407 may alternatively be flooded or partially flooded with seawater. Water may be allowed to pass through the low friction slides 307 as the upper chamber 1407 pressure oscillates. A ballast weight 1408 is attached to a bottom flange 1409 of the passive translator 202 to lower the center of gravity relative to the center of buoyancy and provide greater rotational moment of inertia restoring force in response to the extension of the module 101 due to wave action, supplementing the pneumatic reaction of the upper chamber 1407. Additionally, the shift in center of buoyancy will allow a vertical orientation of the module 101 during deployment or recovery, as previously described.

Figure 16:
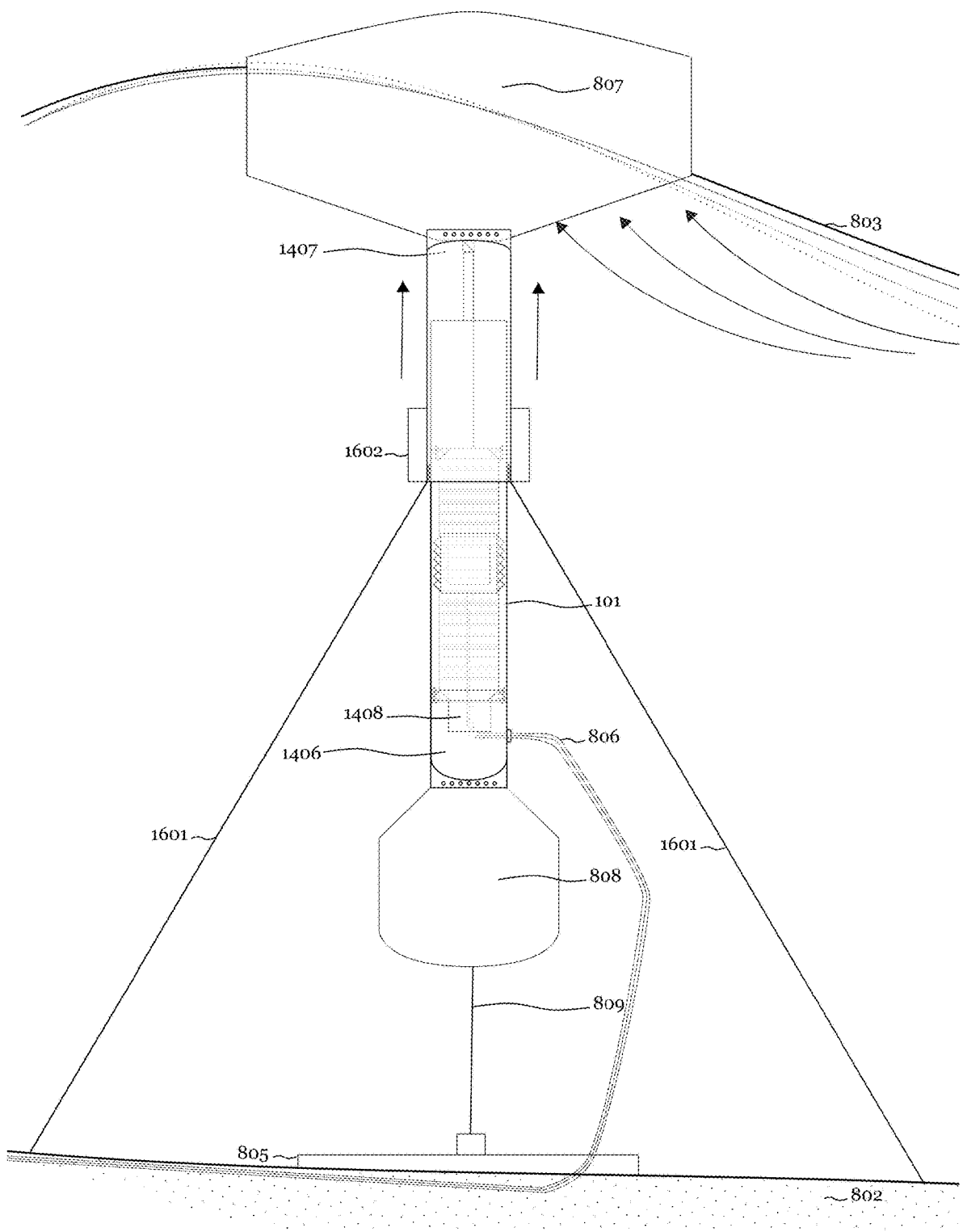
FIG. 16 is a depiction of an alternative implementation of the simplified linear module.
Figure 17:
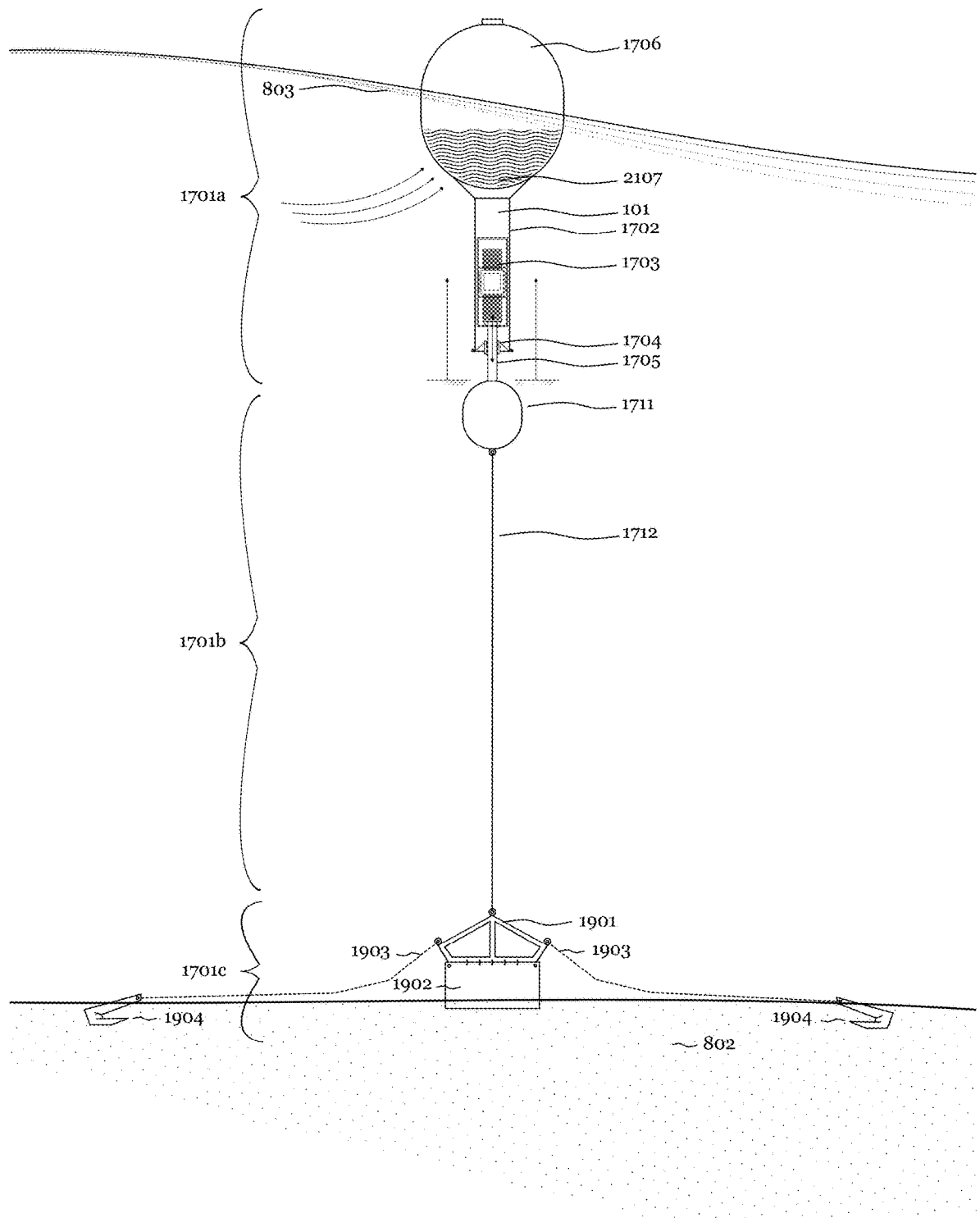
FIG. 17 is a depiction of an alternative implementation for a two-body wave energy converter.

As seen in FIG. 16, the module 101 as depicted in FIGS. 14 and 15, may be integrated into a system similar to FIG. 10, where the reference subassembly 103 may be a secondary floating body 808, and the connector to the sea floor is a mooring line 809 to the reference body 805 such as a foundation, pile, or anchor, allowing for a compliant reference to the seabed 802 with a first stiffness, while still capitalizing off the relative motion between the waves 803 and the seabed 802. The system may supplement the restoring force provided by the upper chamber 1407 with a secondary set of mooring lines 1601 extending from the actuated subassembly 102 to the seabed 802, the secondary set of mooring lines having a second stiffness less than the first stiffness of the primary mooring line 809, applying a restoring force to the actuated subassembly in the downward direction of travel relative to the reference subassembly integral to the moored secondary floating body 808. Further, the internal ballast 1408 may be supplemented by external ballast 1602 connected to the actuated shell 201, providing less of a shift in center of gravity compared to the internal ballast 1408 as employed in the system described with respect to FIG. 14, but still improving upon the rotational moment of inertia compared to ballast contained within the floating body 807 without the constraint of internal volume within the lower chamber 1406.

One application of a modularized PTO system allows a structurally lightweight two body WEC which successfully produces relative motion between the two bodies in operational wave conditions while allowing both bodies to move in unison in large waves, reducing loads within the PTO in extreme conditions thereby reducing loads and capital cost of the machine, while retaining power performance.

The alternative implementation shown in FIGS. 17-22 provides an enhanced two-body wave energy converter. For purposes of illustration, an example of the implementation of a wave energy converter 1700, is presented in FIG. 17. The wave energy converter has three main assemblies, a wave activated body assembly 1701a, a reaction body assembly 1701b and a mooring assembly 1701c.

Figure 18:
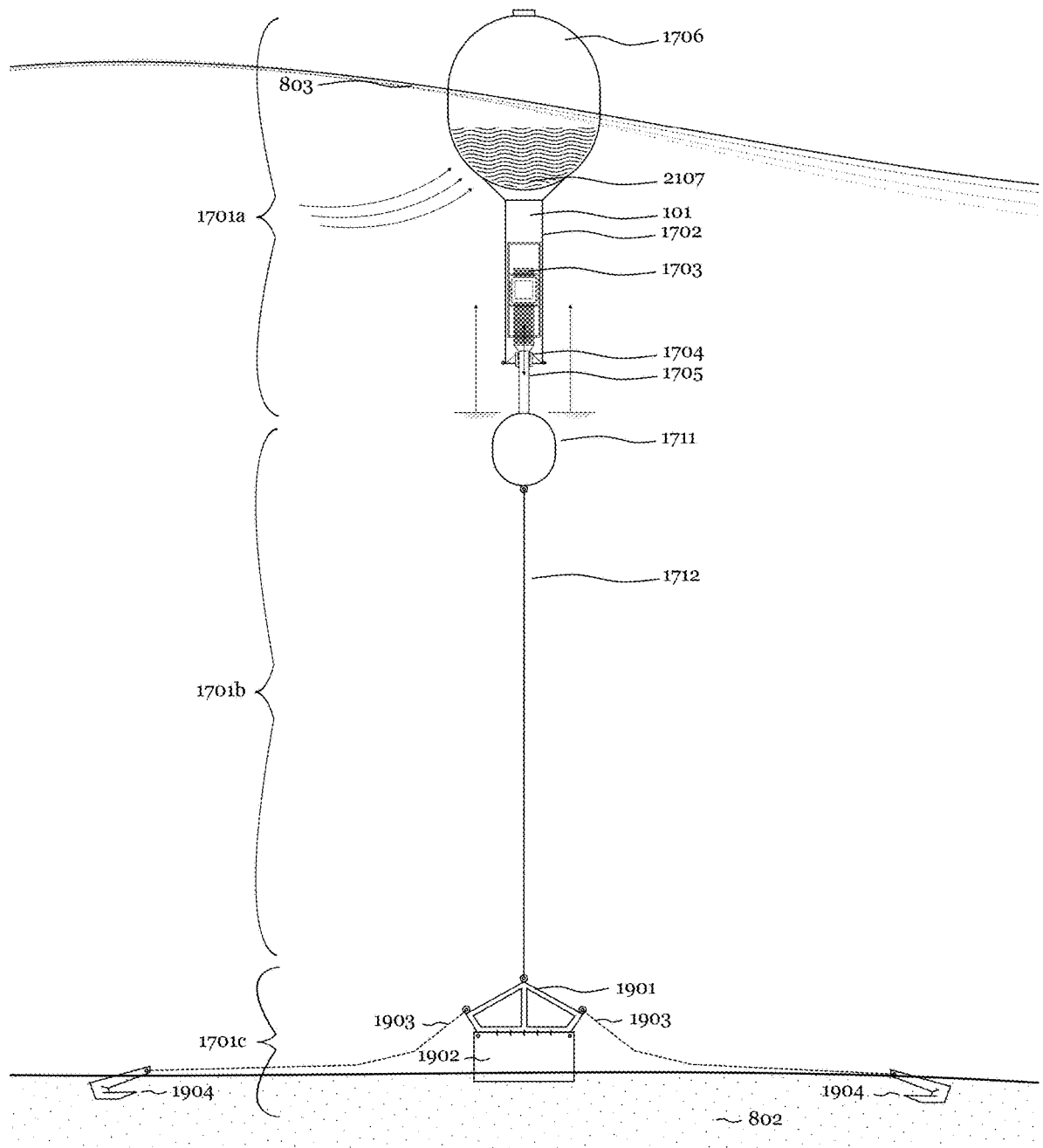
FIG. 18 is a depiction of the relative motion between two bodies of the wave energy converter in normal operation.

The wave activated body assembly 1701a is comprised of a buoyant floating body 1706 and a linear module 101 having a housing tube 1702, a linear electric direct drive (LEDD) machine 900, a seal subassembly 1704, which allows an input rod 1705 to reciprocate longitudinally, concentrically constrained relative to the housing tube 1702 vertical axis with the upper end of the input rod 1705 mechanically affixed to the translator 202 of the linear electric machine 900 and the lower end mechanically affixed to the reaction body 1711. The stator 302 of the linear electric machine 900 is supported in the housing tube 1702 by an intermediate frame 1714, which is inserted into the housing tube 1702 and affixed via mechanical mounting brackets 1715 as shown in FIGS. 23A, 23B, and 23C. The reaction body 1711 provides a kinematic reference, allowing for relative motion between the wave activated assembly 1701a and the reaction body assembly 1701b when the wave activated body assembly 1701a is excited by waves 803 as shown in FIG. 18.

Figure 24A:
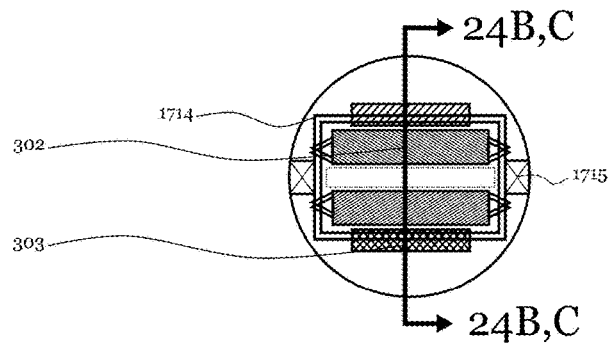
FIG. 24A is a longitudinal cross section of the linear electric module in the alternative implementation of the two-body wave energy converter.
Figure 24B:
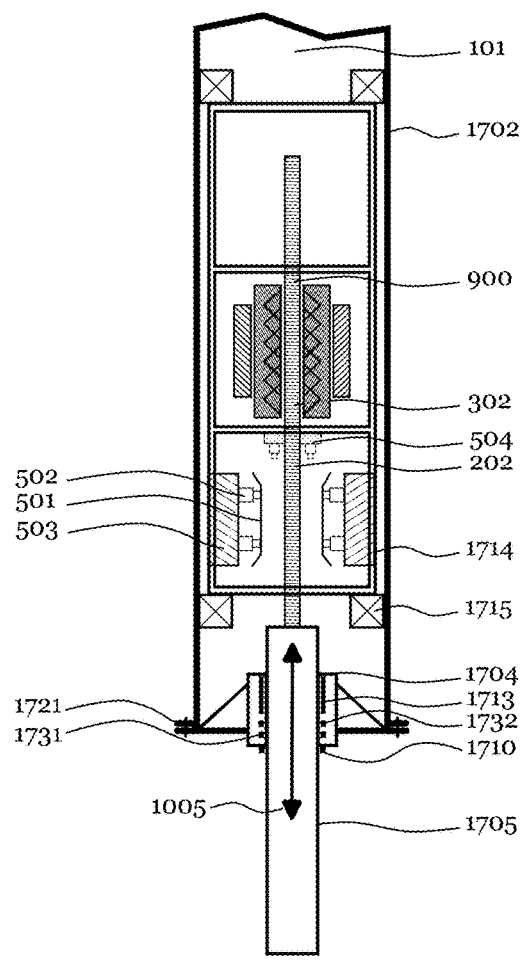
FIG. 24B is a lateral cross section of the linear module along line 24B-24B in FIG. 24A showing the linear braking system in an inactivated state.
Figure 24C:
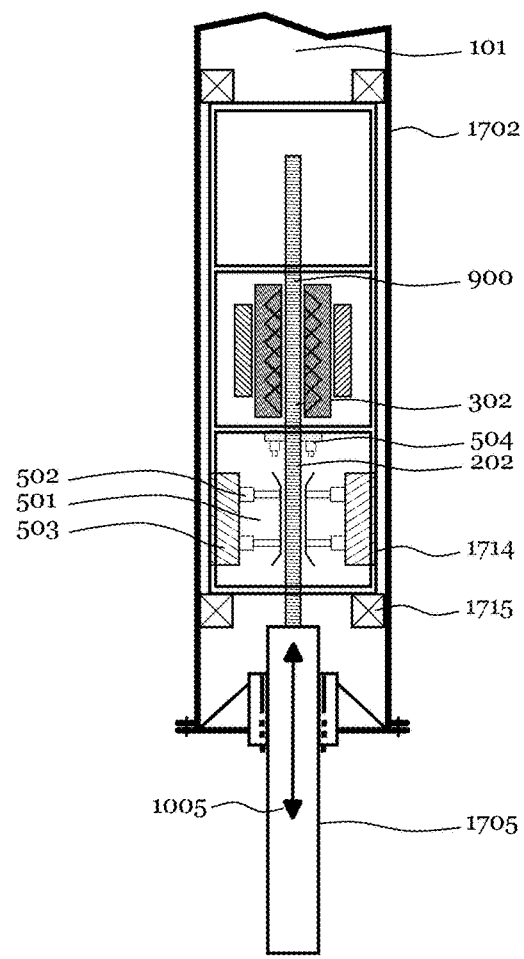
FIG. 24C is a lateral cross section of the linear module along line 24C-24C in FIG. 24A showing the linear braking system in an activated state.

This implementation, similar to that described with regard to FIGS. 6A-6C, and using common element numbers for comparable elements, will employ eddy current brake comprised of opposing conductive flat plates 501 (e.g. aluminum) of width similar to that of the translator, brake actuators 502, or system of linear actuators affixed to the above flat plate producing a motion orthogonal to the surfaces of the translator 202, and mechanical mounts 503 coupling the brake actuator to a the intermediate frame 1714 as shown in FIGS. 23A,B,C and FIGS. 24A,B,C. Emergency end stops 504 will similarly be utilized in this implementation providing a limit to travel of the input rod 1705.

Figure 19:
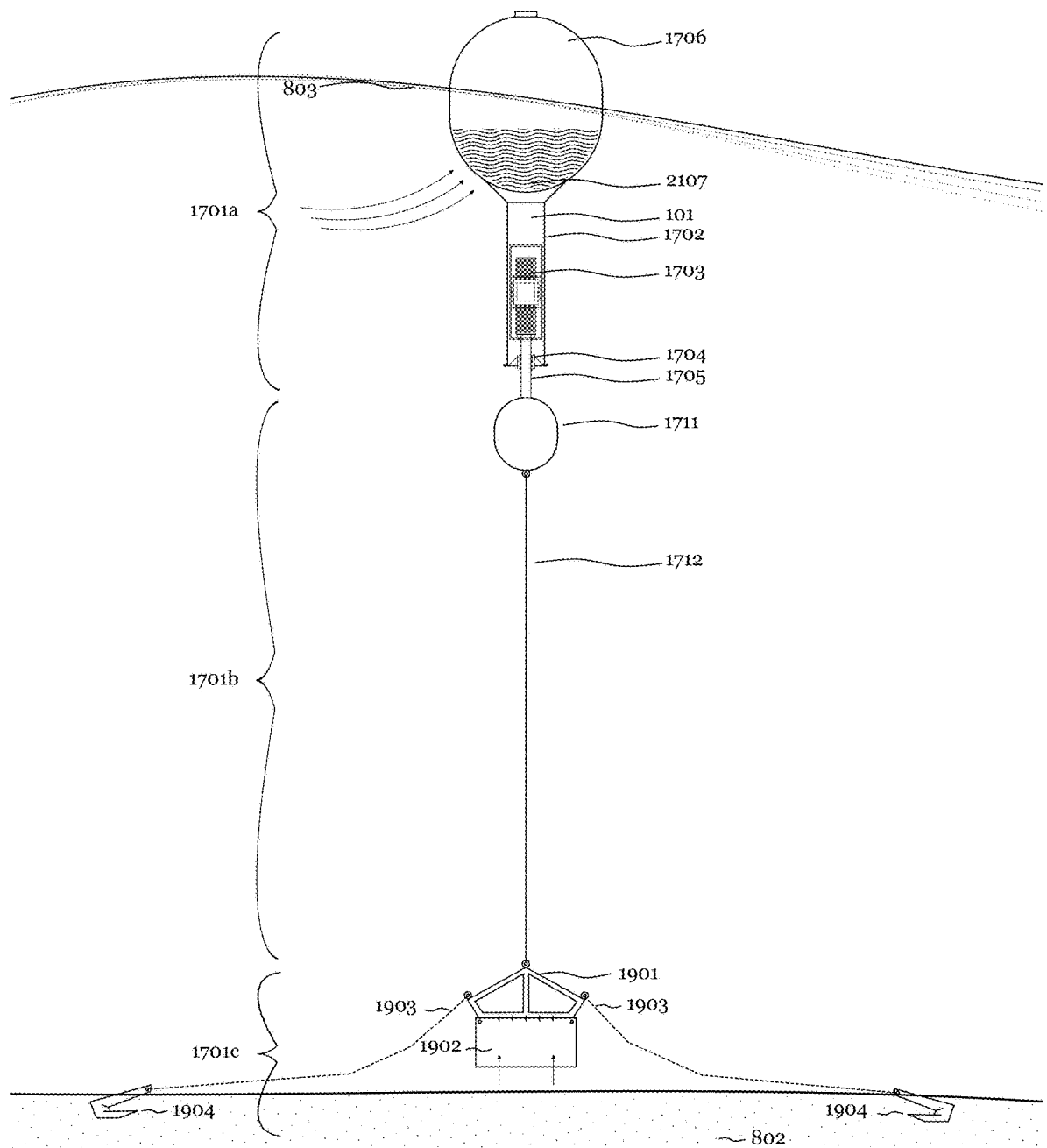
FIG. 19 is a depiction of the liftoff mass lifting from seabed to alleviate force transmission in waves with large amplitude.
Figure 25:
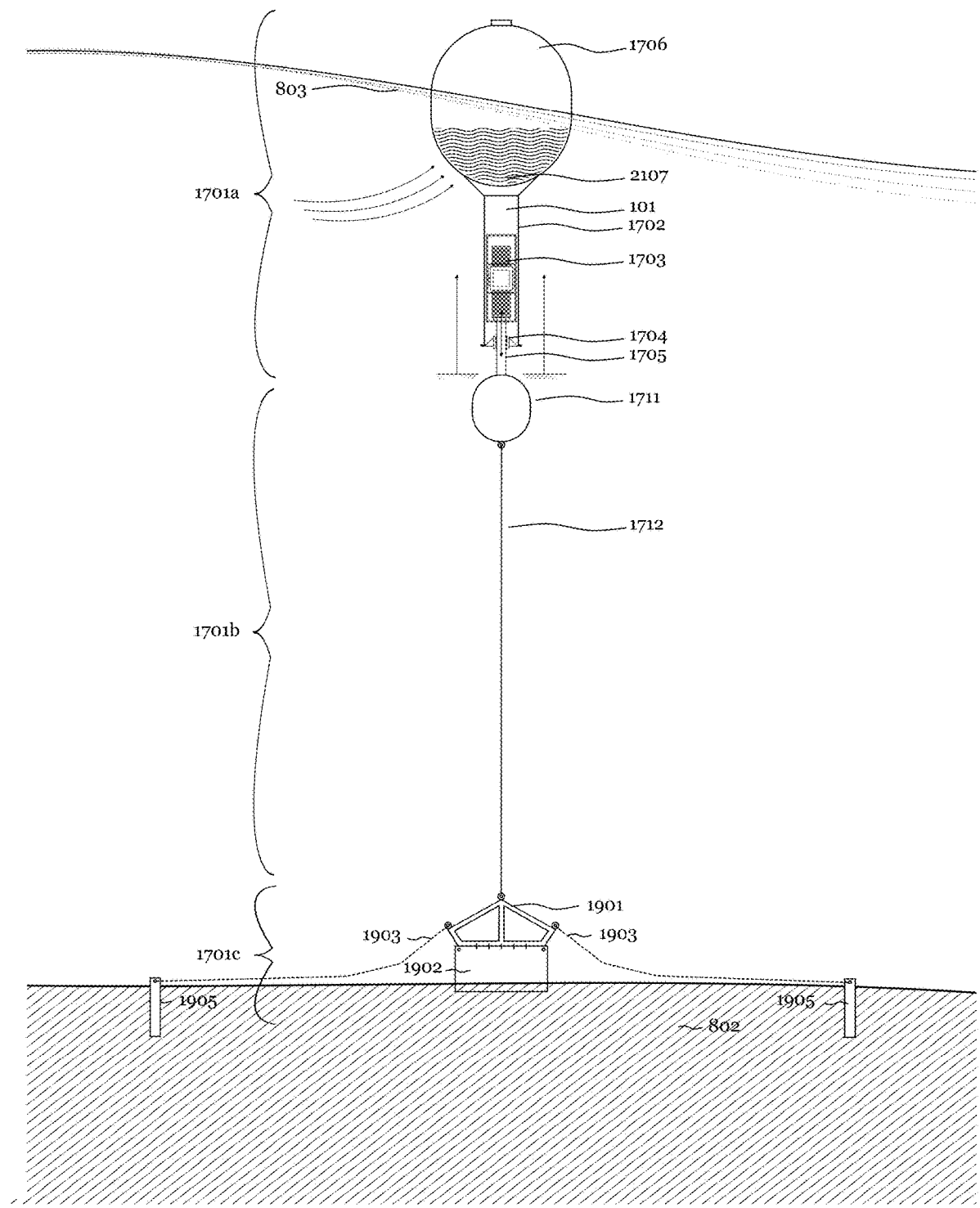
FIG. 25 shows alternative anchor piles for securing a mooring assembly.

The reaction body 1711 maintains a stable position in the vertical, heave, degree of freedom when a force is applied in the downward direction due to it having a positive buoyancy larger than the maximum linear electric machine 900 force application, and in the upward force direction due to a high modulus taught vertical tether 1712, connecting the reaction body 1711 to the mooring assembly 1701c with a pretention (T) calculated for a range of $(F_{pto\_max}) \leq T \leq (F_{pto\_max}*4)$ where Fpto max is the maximum force generated by the linear electric machine 900 on the input rod 1705. The mooring assembly 1701c is comprised of a liftoff mass 1902, mechanically affixed below a space frame 1901. The space frame 1901 provides connection points for the taught vertical tether and a plurality of spread mooring legs 1903 above and beside the liftoff mass 1902, preventing the mooring legs 1903 from falling under the liftoff mass 1902 in dynamic events, therefore avoiding damage to the mooring legs from the liftoff mass falling atop them. The spread mooring legs lay horizontally along the seabed 802 and terminate at drag embedment anchors 1904 statically affixed to the seabed 802, or alternatively anchor piles 1905 as shown in FIG. 25. The drag embedment anchors 1904 and corresponding spread mooring legs 1903 prevent substantial lateral movement of the space frame 1901 and liftoff mass 1902 along the seabed, while allowing for vertical motion of the liftoff mass and space frame if the wave activated body assembly 1701a and reaction body assembly 1701b transmit large forces to the space frame 1901 due to waves 803 with large magnitude, as shown in FIG. 19. The liftoff mass 1902 therefore provides an analog to a fuse where load transmission is permitted between the wave activated body assembly 1701c and the seabed 802 for the desired operational forces which yield power generation in small and moderate waves, while breaking this direct load transmission and allowing greater heave compliance of the wave energy converter to survive large waves exceeding a stroke limit of the linear electric machine 900. In an exemplary implementation, the wet mass is in the range of 10 to 200 tons.

The two-body wave energy converter enables power capture through the relative motion between the wave activated body assembly 1701a and the reaction body assembly 1701b. The vertical distance between the bottom of the wave activated body assembly 1701a and the top of the reaction body 1711 is approximately half the stroke of the linear electric machine 900 at equilibrium. This distance allows for relative motion in both directions before reaching the stroke limit of the linear electric machine 900. In an exemplary implementation the stroke of the linear electric machine 900 is between 0.5 m and 4.0 m. Further, the distance is determined by the length of the taut vertical tether 1712 and the hydrostatic equilibrium of the wave activated body assembly 1701a, with no internal mechanical stiffness dictating the mechanical linkage between the two bodies.

Figure 20:
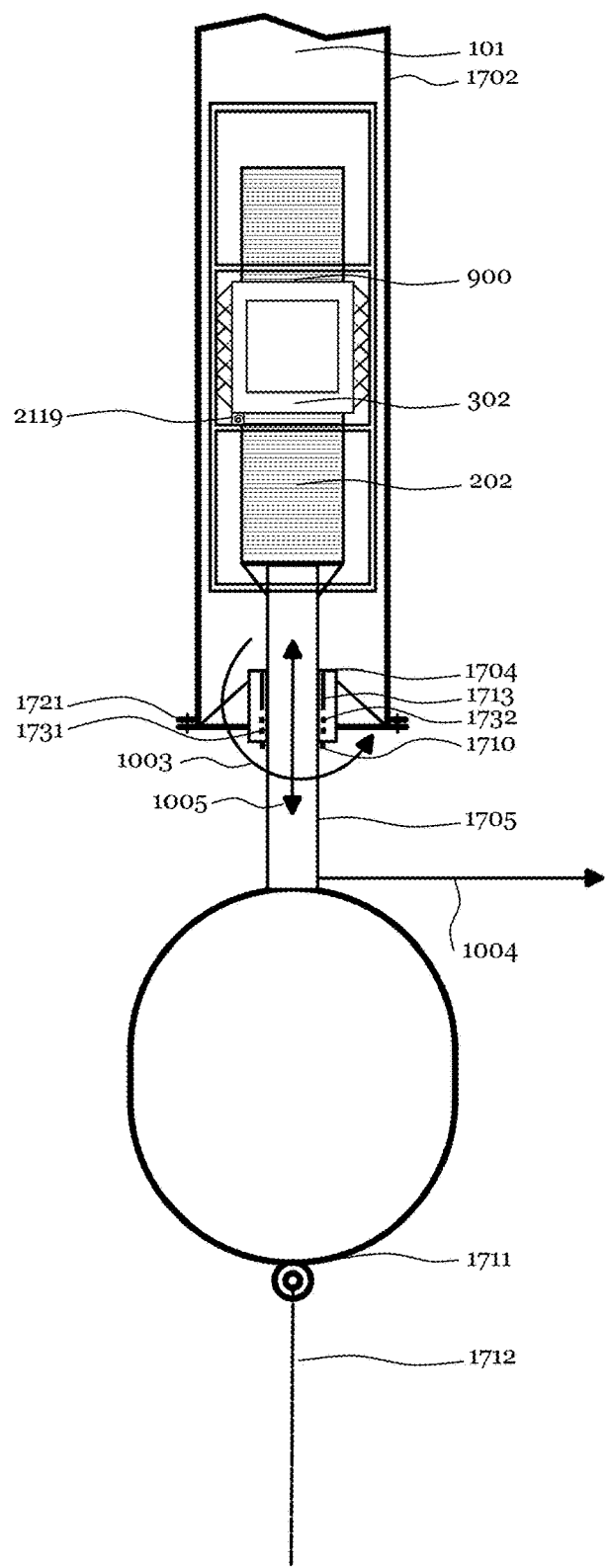
FIG. 20 is a depiction of the seal subassembly.

The functional linkage between the two bodies is entirely achieved by the input rod 1705 and seal subassembly 1704 shown in FIG. 20. The input rod 1705 upper end is affixed to the linear electric machine 900 translator 202 within the dry, air-filled volume of the housing 1702. Below the translator 202, the input rod 1705 passes through the seal assembly 1704 before reaching the seawater of the housing 1702 exterior and terminating with a mechanical connection to the reaction body 1711 on its lower end.

The seal assembly 1704, includes a scraper 1710, which removes hard materials which may become deposited on the seawater exposed portion of the input rod 1705, primarily due to marine growth or biofouling. The scrapper 1710 is slightly larger than the outside diameter of the input rod 1705 and is composed of a hard polymer or composite material with a hardness (e.g. Rockwell C 50-70) near or slightly lower than the surface of the input rod to allow for scraping action without compromising the input rod 1705 material wear life. Shown above the scraper 1710 within the seal subassembly 1704, the next component is a wiper 1731, which further cleans the input rod 1705 of debris, composed of a softer polymer or elastomer material preparing the input rod 1705 surface for the next component, a seal 1732 tightly interfaced with the input rod 1705 outer diameter, preventing water ingress into the housing 1702. Shown above the seal 1732, the final component in the seal assembly is a cylindrical bearing sleeve 1713 which resists bending moment 1003 and shear 1004 while allowing the intended reciprocating vertical heave degree of freedom 1005. The bearing sleeve 1713 is composed of a polymer of similar hardness to the input rod 1705 surface (e.g. Rockwell C 60-70) to allow good wear life. The material of the bearing sleeve 1713 is selected for low static and dynamic friction coefficients (e.g. 0.05-0.15) to prevent mechanical losses in the system prior to power extraction via the linear electric machine 900. To counteract the bending moments 1003 and shear forces 1004 imparted upon the input rod 1705, and subsequently the bearing sleeve 1713 and seal subassembly 1704, the seal subassembly 1704 is firmly supported by a housing cap 1721, a circular end plate encapsulating the housing tube 1702 by closing the lower end of the housing 1702 when affixed via an integrated bolted flange or comparable structure.

Figure 21:
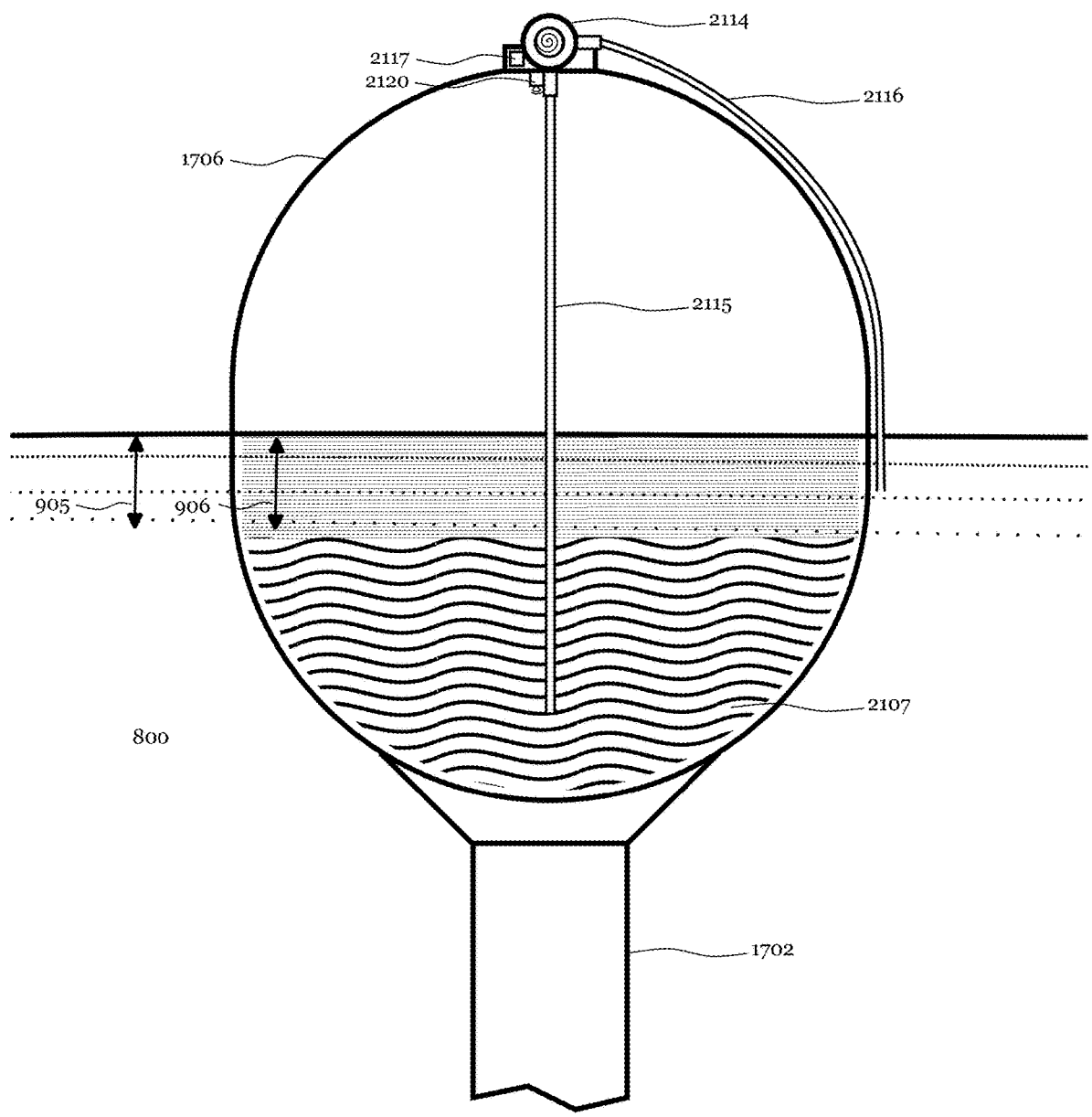
FIG. 21 is a depiction of the floating body ballasting system.

The wave energy conversion system requires a specific waterline to achieve the desired vertical distance between the two bodies, and this is achieved through the use of a lightweight floating body 1706 containing a ballast 2107 drawn from the surrounding seawater 800. As the relative tide line 905 rises and falls throughout its regular cycle, a ballast pump 2114 is used to fill and empty the water ballast 2107 via an internal hose 2115 reaching a bottom of floating body 1706 bottom and an external hose 2116 reaching the waterline as depicted in FIG. 21, responsive to a ballast control system 2117.

Figure 22:
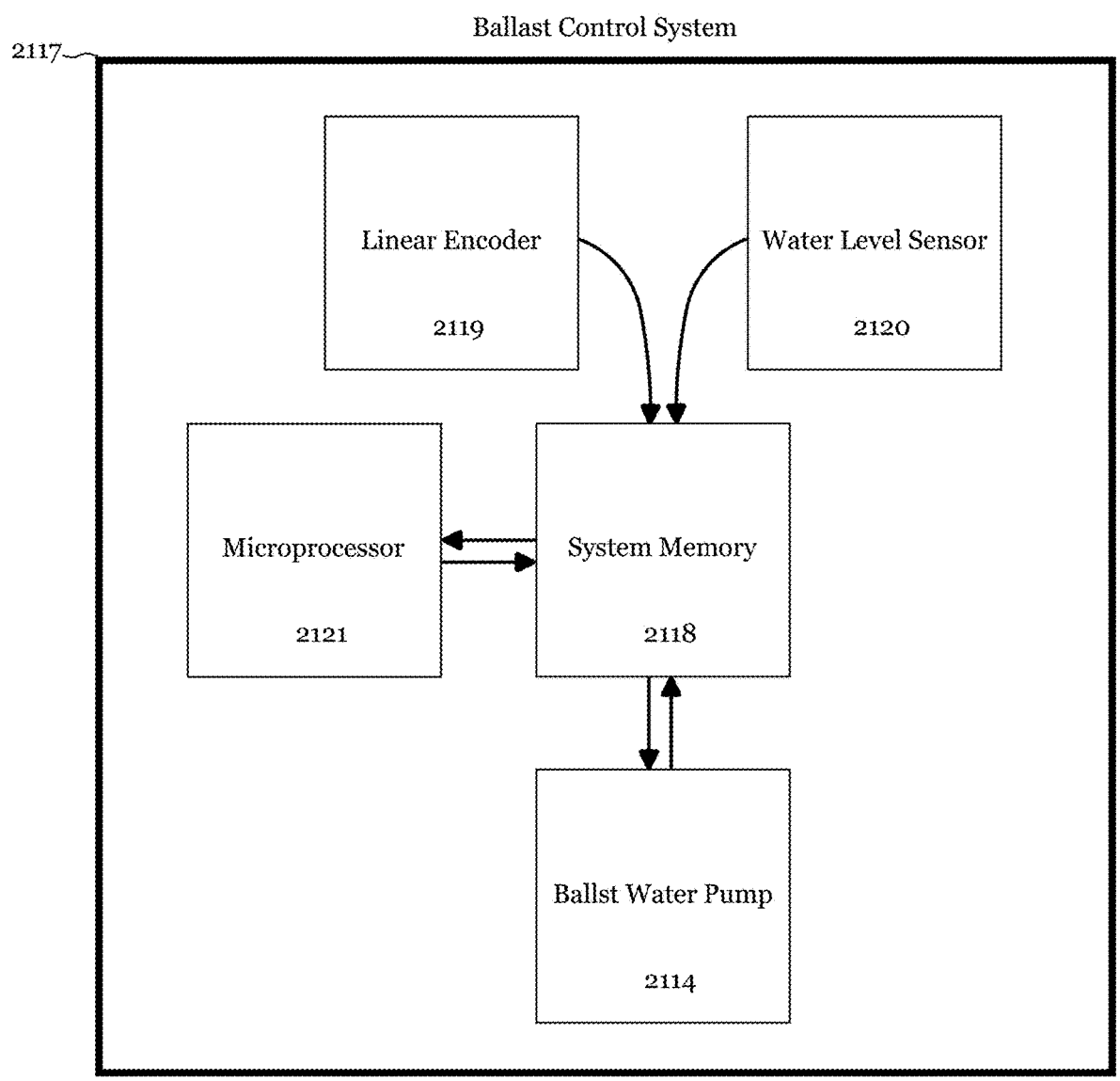
FIG. 22 is a logical flow chart of the ballasting control system.

The ballast control system 2117 is presented as a flow diagram in FIG. 22. The ballast control system 2117, a microprocessor 2221 with stored control code, directly controls the ballast pump 2114. Feedback is provided to the ballast control system 2117 directly from sensors (to be described subsequently) and from a time history of sensor readings stored in system memory 2118. These feedback sensors include a linear encoder 2119, providing the linear position of the stroke of the linear electric machine 900 in linear module 101, which can be used to calculate the equilibrium waterline of the wave activated body assembly 1701a by subtracting the observed mean stroke from the desired mean stroke. An interior fluid level sensor 2120 (capacitive wire, ultrasonic, or infrared) provides the ballast 2107 level within the buoyant body 1706. While the mean stroke position of the linear electrical machine 900 in linear module 101 differs from the desired position, the pump 2114 will either add or remove sea water 800 from ballast 2107 to match the desired position.

While the invention has been described with reference to specific implementations, it will be understood by those skilled in the art that various changes may be made, and equivalents may be substituted for elements thereof without departing from the true spirit and scope of the invention. In addition, modifications may be made without departing from the essential teachings of the invention as defined in the following claims.

The invention claimed is:

1. A wave energy conversion system comprising:
   a buoyant wave activated floating assembly comprising:
   a floating body and
   at least one linear module having:
   a housing tube;
   a linear electric direct drive machine carried within the housing tube; and
   a sealed reciprocating input rod extending from the housing tube and connected to the linear electric direct drive machine;
   a reaction body assembly connected to the input rod, having a positively buoyant, submerged reaction body and a taut vertical tether;
   wherein the reaction body assembly provides a kinematic reference and connection to the reciprocating input rod which is received in the housing tube, and actuates a translator of the linear electric direct drive machine, reciprocating longitudinally relative to a stator, wherein the floating body comprises a lightweight buoy ballasted with seawater such that the vertical distance between the bottom of the wave activated floating assembly and the top of the reaction body assembly is approximately half the stroke of the linear electric direct drive machine at equilibrium.

2. The wave energy conversion system as defined in claim 1 wherein the floating body is actively ballasted to match a desired equilibrium position in response to varying waterline over a tidal cycle.

3. The wave energy conversion system as defined in claim 1 wherein the input rod passes through a seal assembly, including a scraper, wiper, seal, and bearing sleeve, where the input rod serves as the main structural linkage between the wave activated floating assembly and the reaction body assembly in addition to transmitting mechanical power into the linear electric direct drive machine, with the interface between the input rod and bearing sleeve resisting all mechanical shear and moments.

4. The wave energy conversion system as defined in claim 1 further comprising:
   a mooring assembly connected to the taut vertical tether comprising:
   a liftoff mass configured to liftably rest on a sea bottom and connected to the taut vertical tether;
   a plurality of spread mooring lines;
   and a plurality of drag embedment anchors connected to the plurality of spread mooring lines.

5. The wave energy conversion system as defined in claim 4 wherein the liftoff mass has a wet mass greater than a maximum positive vertical force exerted by the linear electric direct drive machine plus a pretension (T) in the taut vertical tether, providing a stable reference for power generation in small and moderate waves, the wet mass determined to allow the liftoff mass to lift from the seabed responsive to large waves, allowing for expanded heave compliance in survival conditions.

6. The wave energy conversion system as defined in claim 4 wherein a space frame structure is affixed to the top of the liftoff mass, configured as a connection point for the taut vertical tether and the plurality of spread mooring lines which constrain lateral movement of the liftoff mass.

7. The wave energy conversion system as defined in claim 6 wherein the taut vertical tether is a low stretch synthetic fiber line.

8. The wave energy conversion system as defined in claim 7 wherein the taut vertical tether is specifically high-modulus polyethylene (HMPE).

9. The wave energy conversion system as defined in claim 6 wherein the plurality of spread mooring lines each comprise a steel chain, terminating in one of the plurality of drag embedment anchors.

10. The wave energy conversion system as defined in claim 6 wherein the plurality of spread mooring lines are a high stretch synthetic fiber line.

11. The wave energy conversion system as defined in claim 10 wherein the plurality of spread mooring lines are specifically polyester or nylon.

12. A wave energy conversion system comprising:
    a buoyant wave activated floating assembly comprising:
    a floating body and
    at least one linear module having
    a housing tube;
    a linear electric direct drive machine carried within the housing tube; and
    a sealed reciprocating input rod extending from the housing tube and connected to the linear electric direct drive machine;
    a reaction body assembly connected to the input rod, having a positively buoyant, submerged reaction body and a taut vertical tether;
    wherein the reaction body assembly provides a kinematic reference and connection to the reciprocating input rod which is received in the housing tube, and actuates a translator of the linear electric direct drive machine, reciprocating longitudinally relative to a stator,
    wherein the input rod passes through a seal assembly, including a scraper, wiper, seal, and bearing sleeve, where the input rod serves as the main structural linkage between the wave activated floating assembly and the reaction body assembly in addition to transmitting mechanical power into the linear electric direct drive machine, with the interface between the input rod and bearing sleeve resisting all mechanical shear and moments.

13. The wave energy conversion system as defined in claim 12 wherein the floating body is actively ballasted to match a desired equilibrium position in response to varying waterline over a tidal cycle.

14. A wave energy conversion system comprising:
    a buoyant wave activated floating assembly comprising:
    a floating body and
    at least one linear module having
    a housing tube;
    a linear electric direct drive machine carried within the housing tube; and a sealed reciprocating input rod extending from the housing tube and connected to the linear electric direct drive machine;

a reaction body assembly connected to the input rod, having a positively buoyant, submerged reaction body and a taut vertical tether;

wherein the reaction body assembly provides a kinematic reference and connection to the reciprocating input rod which is received in the housing tube, and actuates a translator of the linear electric direct drive machine, reciprocating longitudinally relative to a stator, a mooring assembly connected to the taut vertical tether comprising:

a liftoff mass configured to liftably rest on a sea bottom and connected to the taut vertical tether;

a plurality of spread mooring lines;

and a plurality of drag embedment anchors connected to the plurality of spread mooring lines.

15. The wave energy conversion system as defined in claim 14 wherein the liftoff mass has a wet mass greater than a maximum positive vertical force exerted by the linear electric direct drive machine plus a pretension (T) in the taut vertical tether, providing a stable reference for power generation in small and moderate waves, the wet mass determined to allow the liftoff mass to lift from the seabed responsive to large waves, allowing for expanded heave compliance in survival conditions.

16. The wave energy conversion system as defined in claim 14 wherein a space frame structure is affixed to the top of the liftoff mass, configured as a connection point for the taut vertical tether and the plurality of spread mooring lines which constrain lateral movement of the liftoff mass.

17. The wave energy conversion system as defined in claim 16 wherein the taut vertical tether is a low stretch synthetic fiber line.

18. The wave energy conversion system as defined in claim 17 wherein the taut vertical tether is specifically high-modulus polyethylene (HMPE).

19. The wave energy conversion system as defined in claim 16 wherein the plurality of spread mooring lines each comprise a steel chain, terminating in one of the plurality of drag embedment anchors.

* * * * *